US012461770B2

(12) United States Patent
    Sato

(10) Patent No.: US 12,461,770 B2
(45) Date of Patent: Nov. 4, 2025

(54) COMPUTER-READABLE RECORDING MEDIUM STORING PROGRAM, INFORMATION PROCESSING METHOD, AND INFORMATION PROCESSING APPARATUS

(71) Applicant: FSAS Technologies Inc., Kawasaki (JP)

(72) Inventor: Masahiro Sato, Yokohama (JP)

(73) Assignee: Fsas Technologies Inc., Kawasaki (JP)

( * ) Notice: Subject to any disclaimer, the term of this patent is extended or adjusted under 35 U.S.C. 154(b) by 672 days.

(21) Appl. No.: 17/861,610

(22) Filed: Jul. 11, 2022

(65) Prior Publication Data

US 2023/0125847 A1    Apr. 27, 2023

(30) Foreign Application Priority Data

Oct. 27, 2021 (JP) ................................. 2021-175835

(51) Int. Cl.
    *G06F 9/455*    (2018.01)
    *G06F 9/50*    (2006.01)
    (Continued)

(52) U.S. Cl.
    CPC ........ *G06F 9/45558* (2013.01); *G06F 9/5077* (2013.01); *G06F 9/541* (2013.01);
    (Continued)

(58) Field of Classification Search
    None
    See application file for complete search history.

(56) References Cited

U.S. PATENT DOCUMENTS

2005/0198351 A1\*    9/2005    Nog ........................ H04L 67/63
                                                              709/238

FOREIGN PATENT DOCUMENTS

JP    2007-227997    9/2007
JP    2009-38717    2/2009
WO    WO-2019070611 A1 \*    4/2019    ............. H04L 12/14

OTHER PUBLICATIONS

Sun, "Latency-aware Optimization of the Existing Service Mesh in Edge Computing Environment", Jun. 18, 2019, KTH Royal Institute of Technology School of Electrical Engineering and Computer Science. (Year: 2019).\*

(Continued)

*Primary Examiner* — Qing Yuan Wu
(74) *Attorney, Agent, or Firm* — STAAS & HALSEY LLP

(57) ABSTRACT

A program causes a computer to execute a process. The process includes: acquiring first delay time when a request is transmitted from a first container group having a proxy container of first type to a second container group having first proxy container of second type by the proxy container of first type; calculating second delay time when the request from the first container group reaches the second container group via third container group that relays communication between proxy containers of different types; performing, when the second delay time is shorter than the first delay time, setting for transmitting the request to the third container group via the proxy container of first type; and adding, when otherwise, a second proxy container of second type to the first container group, and performing setting for transmitting the request to the second container group via the second proxy container.

10 Claims, 25 Drawing Sheets

(51) Int. Cl.
*G06F 9/54* (2006.01)
*H04L 9/40* (2022.01)
*H04L 45/12* (2022.01)
*H04L 45/121* (2022.01)
*H04L 67/56* (2022.01)
*H04L 67/562* (2022.01)

(52) U.S. Cl.
CPC .. *H04L 63/0281* (2013.01); *G06F 2009/4557* (2013.01); *G06F 2212/1024* (2013.01); *H04L 45/12* (2013.01); *H04L 45/121* (2013.01); *H04L 67/56* (2022.05); *H04L 67/562* (2022.05); *H04L 2209/76* (2013.01)

(56) References Cited

OTHER PUBLICATIONS

Nadig, "Testing Resilience of Envoy Service Proxy with Microservices", KTH Royal Institute of Technology School of Electrical Engineering and Computer Science. (Year: 2019).*

* cited by examiner

FIG. 10

| SIDECAR INFORMATION TABLE ||||
|---|---|---|
| SIDECAR TYPE | ITEM NAME | VALUE |
| Istio | USED RESOURCE WHEN 1000 req/s | CPU: 0.35, MEMORY: 40 MB |
| | DELAY TIME WHEN 1000 req/s | 2.65ms |
| Dapr | USED RESOURCE WHEN 1000 req/s | CPU: 0.48, MEMORY: 23 MB |
| | DELAY TIME WHEN 1000 req/s | 1.40ms |

STORAGE UNIT — 110
SIDECAR INFORMATION TABLE — 111

FIG. 14

STORAGE UNIT 110

REQUEST-COUNT-PER-SERVICE-MESH-TYPE TABLE 115

| ORIGINATOR | ORIGINATOR TYPE | DESTINATION TYPE | NUMBER OF REQUESTS/s |
|---|---|---|---|
| App1 | Istio | Dapr | 300 |
| App1 | Istio | Istio | 700 |

COMPUTER-READABLE RECORDING MEDIUM STORING PROGRAM, INFORMATION PROCESSING METHOD, AND INFORMATION PROCESSING APPARATUS

CROSS-REFERENCE TO RELATED APPLICATION

This application is based upon and claims the benefit of priority of the prior Japanese Patent Application No. 2021-175835, filed on Oct. 27, 2021, the entire contents of which are incorporated herein by reference.

FIELD

The embodiments discussed herein are related to a non-transitory computer-readable recording medium storing a program, an information processing method, and an information processing apparatus.

BACKGROUND

As one of virtualization techniques in a computer, there is a technique called container type virtualization. In the container type virtualization, a container in which resources such as a library used for starting an application are collected is defined as a software execution environment. For example, when a node realized by a computer executes a container engine, a container may be formed on the node. The node may be a physical machine including resources such as a central processing unit (CPU) and a random-access memory (RAM), or may be a virtual machine running on a physical machine.

The container is used to execute an application developed by a method called a microservice in some cases. In the microservice, an application is developed as divided services for respective functions. The node causes a plurality of services to run with a plurality of containers, and executes an application by cooperation among the services. A network infrastructure used for the cooperation among the services is referred to as a service mesh. For the service mesh, a proxy disposed for each service is used. The proxy is also realized by a container. A node transmits data of a certain service to another service via a proxy, to control communication between the services. For example, a container group, which is a group of containers including a container for a service and a proxy container that functions as a proxy, is used as one unit of disposition onto a node in some cases.

A communication route determination method by an overlay node belonging to an overlay network has been proposed. In the communication route determination method, the overlay node measures quality of communication from its own node to a destination node in advance, and, on the other hand, acquires, from a relay candidate node, a quality measurement result of communication from the relay candidate node to the destination node. The overlay node compares both in terms of the quality of communication, and when the former is better, do not use a relay node, and sets a route for direct transfer to the destination node as a communication route from its own node to the destination node. When the latter is better, the overlay node sets a communication route in which a relay candidate node that provides the highest quality is used as a relay node.

A method has also been proposed in which a plurality of types of Quality of Service (QoS) such as delay time and a packet loss rate are considered, as the quality of communication acquired by the overlay node.

Japanese Laid-open Patent Publication No. 2007-227997 and Japanese Laid-open Patent Publication No. 2009-38717 are disclosed as related art.

SUMMARY

According to an aspect of the embodiments, a computer-readable recording medium storing a program for causing a computer to execute a process includes: acquiring, where a plurality of containers including a proxy container used for communication with another container group belong to a container group, for an information processing system that executes a plurality of container groups including a first container group having a proxy container of a first type and a second container group having a first proxy container of a second type, first delay time that is reference delay time when a request is transmitted from a first container group to a destination container group by the proxy container of the first type; calculating second delay time when the request from the first container group reaches the second container group via a third container group that relays communication between proxy containers of types different from each other, based on the number of the requests from the first container group to the second container group; performing, when the second delay time is shorter than the first delay time, setting for transmitting the request, which is destined for the second container group from the first container group, to the third container group via the proxy container of the first type; and adding, when the second delay time is equal to or longer than the first delay time, a second proxy container of the second type to the first container group, and performing setting for transmitting the request, which is destined for the second container group from the first container group, to the second container group via the second proxy container The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 10 is a diagram illustrating an example of a sidecar information table;

FIG. 14 is a diagram illustrating an example of a request-count-per-service-mesh-type table;

DESCRIPTION OF EMBODIMENTS

There are a plurality of types of proxy containers. A type of proxy container used for a certain service is selected in accordance with, for example, a development framework used for development of the service.

Thus, one container group and another container group differ in type of proxy container to be used in some cases. When types of proxy containers are different, protocols used for communication are different, and communication is not enabled between both container groups. Accordingly, in order to realize a service mesh in a system in which a plurality of types of proxy containers are mixed, for example, the following method is conceivable.

A first method is a method of separately providing a container group that functions as a gateway. The gateway converts a protocol used in one type of proxy container into a protocol used in another type of proxy container to relay communication between the different types of proxy containers.

A second method is a method in which a plurality of types of proxy containers are caused to coexist in a container group including a container for a service. In this case, a container group that originates a request selectively uses the plurality of types of proxy containers that the originating container group includes, depending on a type of proxy container used in a destination container group.

Although the first method may reduce a consumed resource amount as compared with the second method, there is a problem that there is a possibility that a delay in communication increases due to relay processing in the gateway. On the other hand, in the second method, a delay in communication is suppressed as compared with the first method because the communication does not pass through the gateway, but there is a problem in that consumed resources per container group may increase, and a consumed resource amount may become excessive in accordance with an increase in the number of container groups disposed.

In an aspect, an object of the present disclosure is to make a communication method available that is appropriate in an environment in which a plurality of types of proxy containers are mixed.

Hereinafter, the present embodiments will be described with reference to the accompanying drawings.

First Embodiment

A first embodiment will be described.

Figure 1:
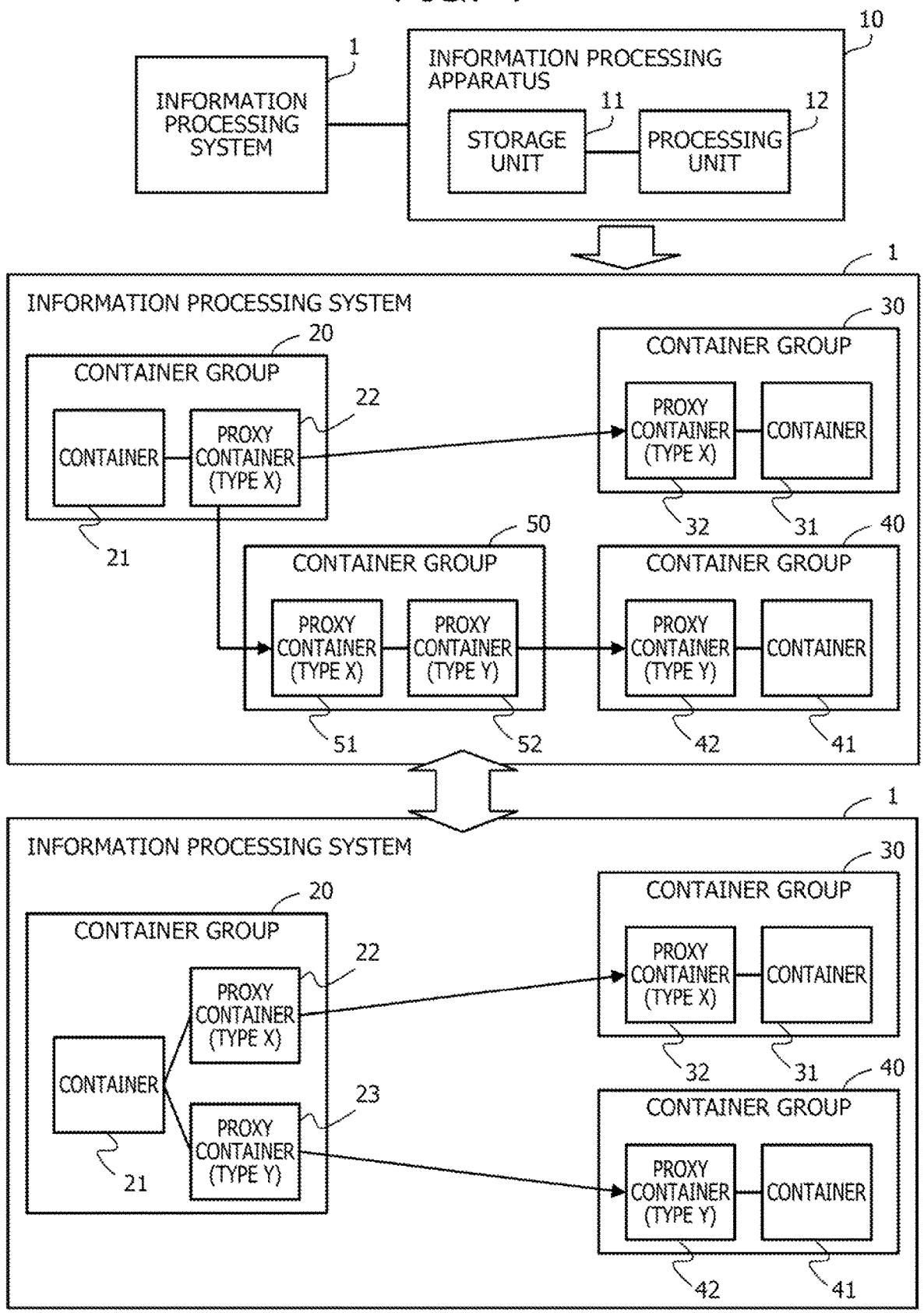
FIG. 1 is a diagram explaining an information processing apparatus of a first embodiment.

FIG. 1 is a diagram explaining an information processing apparatus of the first embodiment.

An information processing apparatus 10 manages communication between container groups executed in an information processing system 1. The information processing apparatus 10 includes a storage unit 11 and a processing unit 12. The storage unit 11 may be a volatile storage device such as a RAM, or may be a non-volatile storage device such as a hard disk drive (HDD) or a flash memory. The processing unit 12 may include a CPU, a digital signal processor (DSP), an application-specific integrated circuit (ASIC), a field-programmable gate array (FPGA), and the like. The processing unit 12 may be a processor that executes a program. The "processor" may be a set of a plurality of processors (multiprocessor). The information processing apparatus 10 may be included in the information processing system 1.

The information processing system 1 executes an application developed by a microservice method. The information processing system 1 includes one or more nodes, and causes a plurality of containers to run on the one or more nodes. The nodes are omitted in FIG. 1. The node may be a physical machine, or a virtual machine that runs on a physical machine. The information processing system 1 executes a plurality of services by the plurality of containers. The information processing system 1 causes the plurality of services to cooperate via a proxy container to execute the application. A unit of service disposition onto a node in the information processing system 1 is a container group including a container that executes a service, and a proxy container.

In the information processing system 1, a container orchestration tool is used that performs integrated management for containers. The container orchestration tool is software that performs creation and deletion of a container, container cluster management, scheduling of determination of a disposition destination node of a container, and the like. An example of the container orchestration tool is Kubernetes (registered trademark). Kubernetes is abbreviated as K8s. For example, in K8s, a container group called a pod is a disposition unit onto a node. However, in the information processing system 1, as the container orchestration tool, one other than the K8s may be used. A proxy container is referred to as a sidecar container, or simply a sidecar in some cases. The information processing system 1 executes container groups 20, 30, and 40.

The container group 20 includes a container 21 and a proxy container 22. The container 21 executes a first service. A type of the proxy container 22 is X.

The container group 30 includes a container 31 and a proxy container 32. The container 31 executes a second service. A type of the proxy container 32 is X.

The container group 40 includes a container 41 and a proxy container 42. The container 41 executes a third service. A type of the proxy container 42 is Y.

As described above, in the information processing system 1, the plurality of types of proxy containers are mixed. For example, examples of a plurality of types of proxy containers on K8s include an Envoy sidecar of Istio, a Linkerd sidecar, and a Dapr sidecar, and the like.

Two proxy containers may directly communicate with each other, as long as the two proxy containers are of the same type. When two proxy containers are of types different from each other, direct communication is impossible. This is because protocols such as encryption used for communication are different. In the case of the above example, both the proxy containers 22 and 32 are of the type X. For this reason, the proxy containers 22 and 32 may directly communicate with each other.

On the other hand, although the type of proxy container 22 is X, the type of proxy container 42 is Y, and the types are different from each other. For this reason, direct communication is impossible between the proxy containers 22 and 42. In order to realize cooperation of the container groups 20 and 40, the processing unit 12 may use the following method.

A first method is a method of providing a container group 50 functioning as a gateway in the information processing system 1. The container group 50 includes proxy containers 51 and 52. A type of the proxy container 51 is X. A type of the proxy container 52 is Y. The container group 50 receives a request from the proxy container 22, by the proxy container 51. The container group 50 transfers the request from the proxy container 52 to the proxy container 42.

A second method is a method of providing a proxy container 23 of the type Y in the container group 20, and causing the proxy container 23 to coexist with the proxy container 22 of the type X. The container group 20 may directly communicate with the proxy container 42 in the container group 40, by the proxy container 23.

Although the first method may reduce a consumed resource amount as compared with the second method, communication may be delayed due to relay processing by the gateway. On the other hand, in the second method, although a communication delay is reduced as compared with the first method, resources consumed per container group may increase, and a consumed resource amount may become excessive in accordance with an increase in the number of container groups disposed.

Accordingly, the processing unit 12 selectively uses the first method or the second method as follows. The processing unit 12 performs the following processing at timing when the container group 20 or another container group is newly disposed, or at a predetermined cycle. When the container group 20 is newly disposed, a container group that executes the same service as that of the container group 20 may already be executed in the information processing system 1. In this case, a part of a load of the already executed container group is distributed to the container group 20 to be newly disposed. When another container group that executes the same service as that of the existing container group 20 is newly disposed, a part of a load of the already executed container group 20 is distributed to the another container group to be newly disposed.

The processing unit 12 acquires first delay time that is reference delay time when a request is transmitted from the container group 20 to a destination container group by using the proxy container 22. The processing unit 12 stores the first delay time in the storage unit 11.

For example, the processing unit 12 may accept input of the first delay time by a user to acquire the first delay time. Delay time in communication by a proxy container changes in proportion to the number of requests transmitted by the proxy container per unit time. Accordingly, the processing unit 12 may calculate the first delay time based on delay time T for the predetermined number of requests A transmitted per unit time, which is made public for a proxy container of the type X.

For example, first, the processing unit 12 acquires the total number of requests B transmitted by the proxy container 22 per unit time. The processing unit 12 may calculate the total number of requests B, based on the number of requests transmitted by the container group 20 in a latest predetermined period. The processing unit 12 may use an existing distributed tracing technique to acquire the number of requests transmitted from each proxy container to a destination proxy container. For example, examples of a tool that provides the distributed tracing technique include Jaeger, Zipkin, and the like.

When another container group that executes the same service as that of the container group 20 is newly disposed, the processing unit 12 calculates the total number of requests B considering that a part of the number of requests of the container group 20 is distributed to the another container group. As an example, the processing unit 12 may proportionally divide the number of requests in a latest predetermined period in the container group 20 between the container group 20 and another container group to be newly disposed to calculate the total number of requests B. When the container group 20 is newly disposed, the processing unit 12 may calculate the total number of requests B based on the number of requests transmitted by a proxy container belonging to an existing container group that executes the same service as that of the container group 20 in a latest predetermined period.

The processing unit 12, based on the total number of requests B, calculates delay time T when a request is directly transmitted from the proxy container 22 to a proxy container of the type X as $T=(B/A)*T$. The processing unit 12 may set the delay time T as the first delay time. Alternatively, the processing unit 12 may set a value obtained by multiplying the delay time T by a predetermined coefficient $\alpha$ as the first delay time. For example, the coefficient $\alpha$ may be a value greater than 1.

Next, the processing unit 12 calculates second delay time when a request from the proxy container 22 reaches the container group 40 via the container group 50, based on the number of requests from the container group 20 to the container group 40. As described above, the delay time corresponding to the predetermined number of requests per unit time in the type X of proxy container, and the delay time corresponding to the predetermined number of requests per unit time in the type Y of proxy container are made public. Accordingly, the processing unit 12, based on the number of requests from the container group 20 with the container group 40 as a destination, and delay time made public for each of the proxy containers 22, 51, and 52, calculates delay time generated in each of the proxy containers 22, 51, and 52. The processing unit 12 sets a sum of the delay time generated in the each of the proxy containers 22, 51, and 52 as the second delay time. The processing unit 12, by calculating delay time based on the number of requests, even when it is difficult to directly measure delay time corresponding to processing in each proxy container, may appropriately obtain the delay time.

The processing unit 12 compares the first delay time with the second delay time, and selects whether to use the above-described first method or second method in accordance with a result of the comparison. For example, when the second delay time is shorter than the first delay time, the processing unit 12 performs setting for the information processing system 1 for transmitting a request, which is destined for the container group 40 from the container group 20, to the container group 50 via the proxy container 22.

For example, when the second delay time is shorter than the first delay time, the processing unit 12 selects the first method of transmitting a request from the container group 20 to the container group 40 via the gateway, and performs routing setting for using the first method. As an example, the processing unit 12 adds a rule for using the proxy container 51 as a transfer destination of a request having the container group 40 as a destination, to a predetermined table that is included in the proxy container 22 and holds information on the transfer destination. Accordingly, the request from the container group 20 to the container group 40 reaches the container group 40 via the container group 50.

The proxy container 23 already exists in the container group 20 in some cases. In this case, the processing unit 12 deletes the proxy container 23 from the container group 20. For example, the processing unit 12 disposes the container group 20 again after deleting the proxy container 23. When the container group 50 to be used as a gateway is not disposed, the processing unit 12 newly disposes the container group 50.

On the other hand, when the second delay time is equal to or longer than the first delay time, the processing unit 12 adds the proxy container 23 to the container group 20. For example, the processing unit 12 disposes the container group 20 again after adding the proxy container 23. The processing unit 12 performs setting for the information processing system 1 for transmitting a request, which is destined for the container group 40 from the container group 20, to the container group 40 via the proxy container 23.

For example, when the second delay time is equal to or longer than the first delay time, the processing unit 12 selects the second method of directly transmitting the request from the container group 20 to the container group 40 by using the type Y of proxy container 23. The processing unit 12 performs routing setting for using the second method. As an example, the processing unit 12 adds a rule for using the proxy container 42 as a transfer destination of a request having the container group 40 as a destination, to a predetermined table that is included in the proxy container 23 and holds information on the transfer destination. The processing unit 12 adds, to routing setting information such as iptables included in the container group 20, a rule for using the proxy container 23 as a transfer destination of a request from the container 21 having the container group 40 as a destination. Accordingly, the request from the container group 20 to the container group 40 directly reaches the container group 40 not via the container group 50.

According to the information processing apparatus 10, for the information processing system 1, the first delay time is acquired that is the reference delay time when a request is transmitted from a first container group to a destination container group by using a first type of proxy container. The first delay time is stored in the storage unit 11. The second delay time when the request from the first container group reaches a second container group via a third container group is calculated based on the number of requests from the first container group to the second container group. The third container group functions as a gateway that relays communication between proxy containers having respective types different from each other. Setting is performed for, when the second delay time is shorter than the first delay time, transmitting a request, which is destined for the second container group from the first container group, to the third container group via the first type of proxy container. When the second delay time is equal to or longer than the first delay time, a second type of second proxy container is added to the first container group. Setting is performed for transmitting a request, which is destined for the second container group from the first container group, to the second container group via the second proxy container. The container group 20 is an example of the first container group. The container group 40 is an example of the second container group. The container group 50 is an example of the third container group.

Accordingly, the information processing apparatus 10 may use an appropriate communication method in an environment in which a plurality of types of proxy containers are mixed. For example, the appropriate communication method is as follows.

When the second delay time is shorter than the first delay time serving as the reference, and even when communication is performed via a gateway, communication quality expected for the information processing system 1 is satisfied. Accordingly, in this case, the processing unit 12 may transmit a request from the container group 20 to the container group 40 through the gateway, for example, the container group 50, to suppress a consumed resource amount.

On the other hand, when the second delay time is equal to or longer than the first delay time serving as the reference, the communication quality expected for the information processing system 1 is not satisfied with the communication via the gateway. Accordingly, in this case, the processing unit 12 may directly transmit the request from the container group 20 to the container group 40 not via the gateway, for example, the container group 50, to suppress delay time.

In this way, by comparing the first delay time with the second delay time to select whether a request destined for a different type of proxy container is to be transmitted via a gateway, or directly, the processing unit 12 may achieve both the suppression of delay time and the suppression of a consumed resource amount.

Functions of the information processing apparatus 10 will be described below in more detail with reference to a more specific example.

Second Embodiment

Next, a second embodiment will be described.

Figure 2:
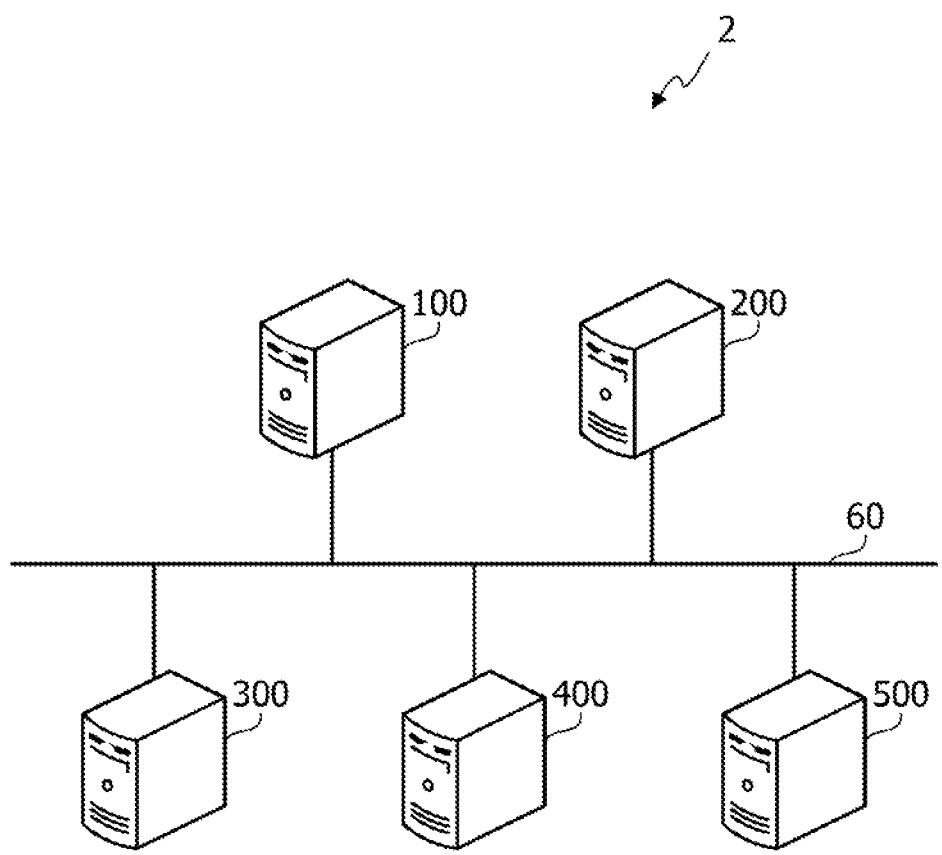
FIG. 2 is a diagram illustrating a hardware example of an information processing system of a second embodiment.

FIG. 2 is a diagram illustrating a hardware example of an information processing system of the second embodiment.

An information processing system 2 executes an application developed by using a microservice method. The information processing system 2 executes a plurality of containers for realizing a plurality of services in the application. For example, the information processing system 2 executes K8s as a container orchestration tool. The information processing system 2 may use another container orchestration tool such as Apache Mesos (Apache is a registered trademark).

The information processing system 2 includes a managing server 100, a master node 200, worker nodes 300, 400, and 500. The managing server 100, the master node 200, the worker nodes 300, 400, and 500 are coupled to a network 60. The network 60 is, for example, a local area network (LAN). For example, the network 60 may be coupled to an external network such as a wide area network (WAN) or the Internet.

The information processing system 2 may make an application executed by the information processing system 2 available for a client computer (not illustrated) via an external network.

The managing server 100 is a server computer that runs on each worker node, and manages a communication method between pods having different types of sidecars. The sidecar is an example of a proxy container. The pod is a unit of container disposition onto a worker node, and is an example of a container group. A service of an application realized by a container on each pod may be referred to as a "microservice". The managing server 100 is an example of the information processing apparatus 10 of the first embodiment.

The master node 200 is a server computer that performs container cluster management, provision of an application programming interface (API) for cooperation with each worker node, scheduling of container disposition onto each worker node, database (DB) management, and the like.

The worker nodes 300, 400, and 500 are each a server computer that executes a container. The worker nodes 300, 400, and 500 communicate with the master node 200 to control the containers.

Figure 3:
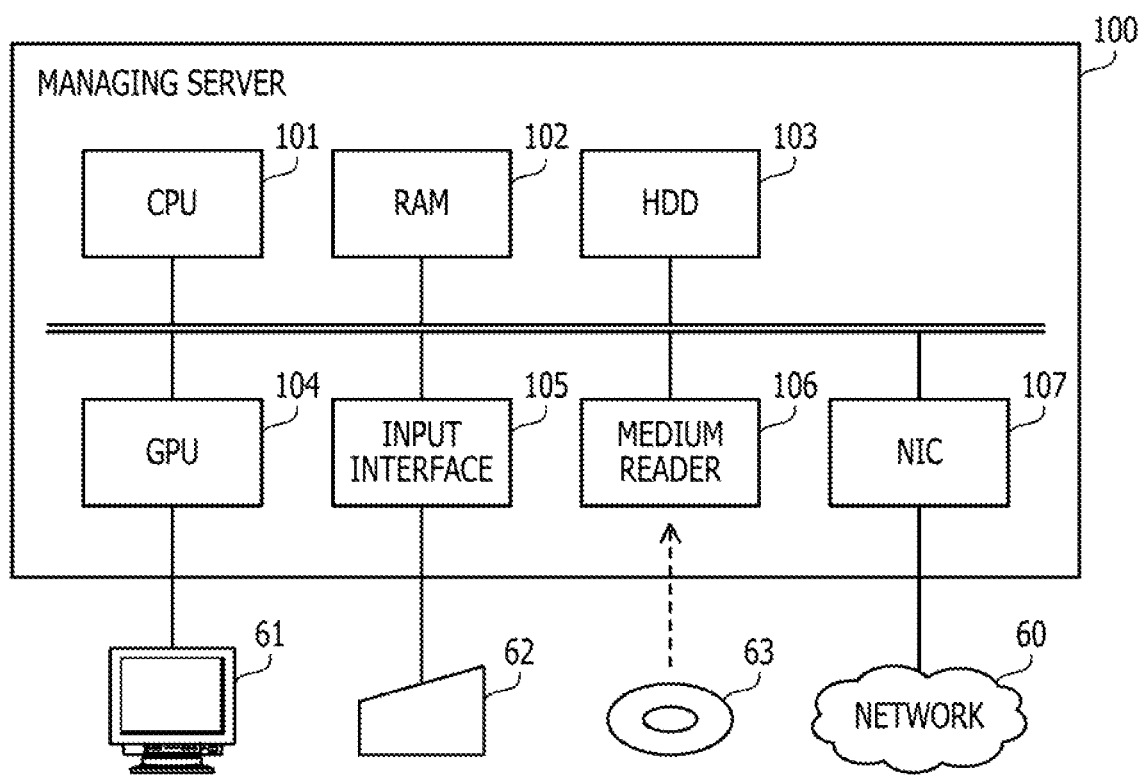
FIG. 3 is a diagram illustrating a hardware example of a managing server.

FIG. 3 is a diagram illustrating a hardware example of the managing server.

The managing server 100 includes a CPU 101, a RAM 102, an HDD 103, a graphics processing unit (GPU) 104, an input interface 105, a medium reader 106, and a network interface card (NIC) 107. The CPU 101 is an example of the processing unit 12 of the first embodiment. The RAM 102 or the HDD 103 is an example of the storage unit 11 of the first embodiment.

The CPU 101 is a processor that executes instructions of a program. The CPU 101 loads at least a part of programs and data stored in the HDD 103 into the RAM 102 and executes a program. The CPU 101 may include a plurality of processor cores. The managing server 100 may include a plurality of processors. Processing described below may be executed in parallel using a plurality of processors or processor cores. A set of the plurality of processors is referred to as a "multiprocessor" or merely referred to as a "processor" in some cases.

The RAM 102 is a volatile semiconductor memory that temporarily stores a program executed by the CPU 101 or data used for operation executed by the CPU 101. The managing server 100 may include a type of memory other than the RAM, or may include a plurality of memories.

The HDD 103 is a non-volatile storage device that stores software programs such as an operating system (OS), middleware, and application software, and data. The managing server 100 may include a storage device of another kind such as a flash memory or a solid-state drive (SSD), and may include a plurality of non-volatile storage devices.

According to an instruction from the CPU 101, the GPU 104 outputs an image to a display 61 coupled to the managing server 100. As the display 61, an arbitrary type of display may be used such as a cathode ray tube (CRT) display, a liquid crystal display (LCD), a plasma display, or an organic electro-luminescence (OEL) display.

The input interface 105 acquires an input signal from an input device 62 coupled to the managing server 100, and outputs the input signal to the CPU 101. As the input device 62, a pointing device such as a mouse, a touch panel, a touchpad, or a trackball, a keyboard, a remote controller, a button switch, or the like may be used. A plurality of types of input devices may be coupled to the managing server 100.

The medium reader 106 is a reading device that reads a program or data recorded in a recording medium 63. As the recording medium 63, for example, a magnetic disk, an optical disc, a magneto-optical (MO) disk, a semiconductor memory, or the like may be used. Examples of the magnetic disk include a flexible disk (FD) and an HDD. Examples of the optical disc include a compact disc (CD) and a Digital Versatile Disc (DVD).

For example, the medium reader 106 copies the program or the data read from the recording medium 63 into another recording medium such as the RAM 102 or the HDD 103. The read program is executed by, for example, the CPU 101. The recording medium 63 may be a portable type recording medium, and is used to distribute the program and the data in some cases. The recording medium 63 and the HDD 103 are referred to as computer-readable recording media in some cases.

The NIC 107 is an interface that is coupled to the network 60 and communicates with another computer via the network 60. The NIC 107 is coupled to, for example, a communication device such as a switch or a router via a cable.

The master node 200, the worker nodes 300, 400, and 500 are also realized by hardware similar to the managing server 100. However, the managing server 100, the master node 200, the worker nodes 300, 400, and 500 may be realized by a plurality of virtual machines running on one or more physical machines including CPUs and RAMs.

Figure 4:
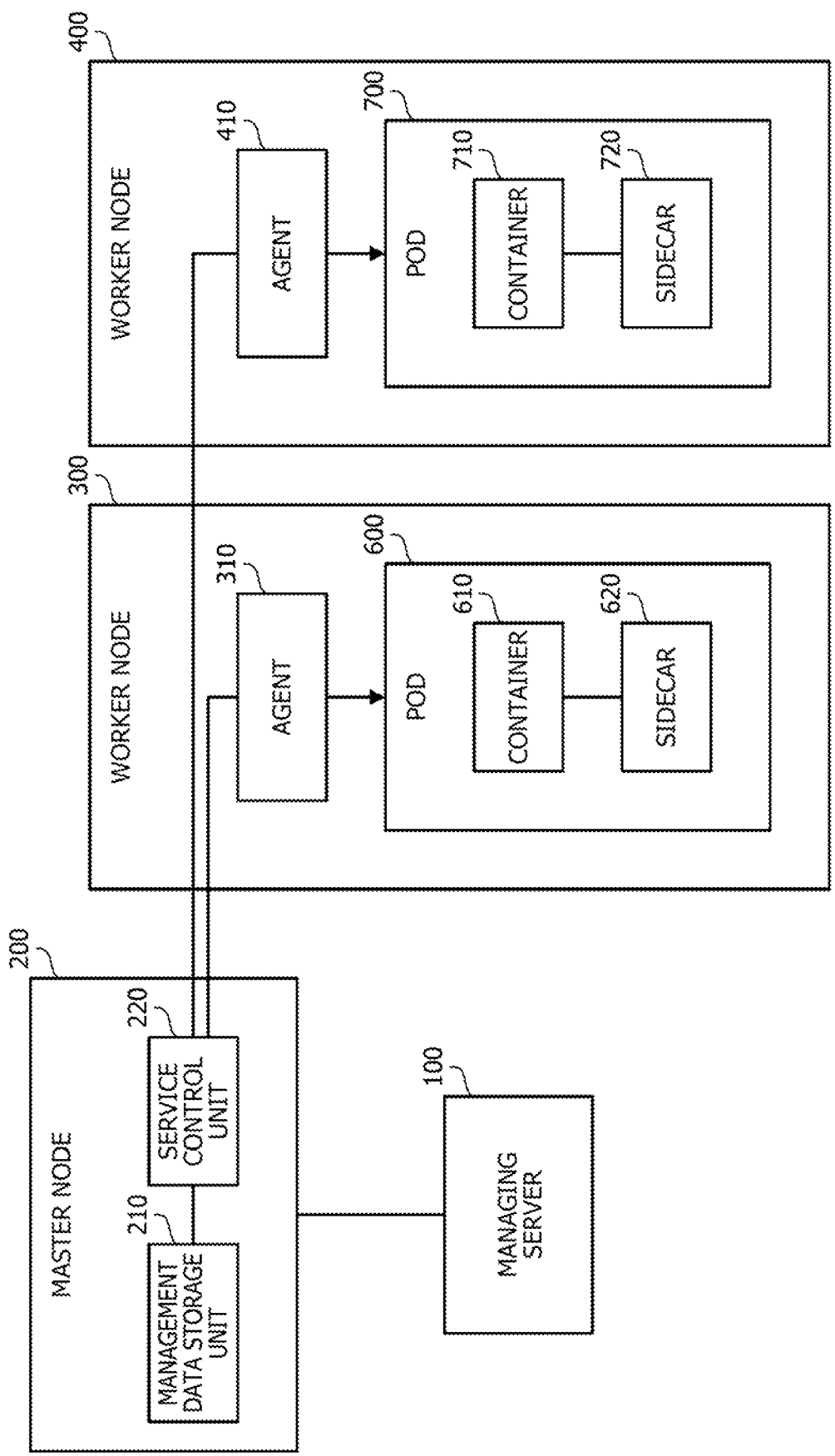
FIG. 4 is a diagram illustrating a control example of worker nodes by a master node.

FIG. 4 is a diagram illustrating a control example of the worker nodes by the master node.

The master node 200 includes a management data storage unit 210 and a service control unit 220. A storage area such as a RAM or an HDD of the master node 200 is used for the management data storage unit 210. The service control unit 220 is realized by the CPU of the master node 200 executing a program stored in the RAM of the master node 200.

The worker node 300 includes an agent 310 and a pod 600. The agent 310 and the pod 600 are realized by a CPU of the worker node 300 executing a program stored in a RAM of the worker node 300.

The worker node 400 includes an agent 410 and a pod 700. The agent 410 and the pod 700 are realized by a CPU of the worker node 400 executing a program stored in a RAM of the worker node 400.

Each of the agents 310 and 410 starts a pod on a node thereof according to an instruction from the master node 200. Each of the agents 310 and 410 monitors a status of a node thereof and notifies the master node 200 of the status. The agents 310 and 410 are each called as a kubelet.

Although not illustrated, the worker node 500 also executes an agent and a pod in the same manner as the worker nodes 300 and 400. Each of the worker nodes 300, 400, and 500 may execute a plurality of pods.

The service control unit 220 communicates with the agent 310 and instructs the agent 310 to dispose the pod 600 onto the worker node 300 and start the pod 600. The service control unit 220 communicates with the agent 310 and instructs the agent 310 to stop or delete the pod 600 running on the worker node 300, in some cases. The disposition of a pod onto a worker node is referred to as deployment in some cases. The deletion of a pod from a worker node is referred to as undeployment in some cases.

The service control unit 220 communicates with the agent 410 and instructs the agent 410 to dispose the pod 700 onto the worker node 400 and start the pod 700. The service control unit 220 communicates with the agent 410 and instructs the agent 410 to stop or delete the pod 700 running on the worker node 400, in some cases.

The pod 600 includes a container 610 and a sidecar 620. The pod 700 includes a container 710 and a sidecar 720.

The containers 610 and 710 are each a component in which programs, libraries, and the like of an application are collected as one. The containers 610 and 710 each implements one service.

The sidecar 620 is a component that functions as a proxy that performs communication between the pod 600 and another pod. The sidecar 620 is also realized as a container. As in the case of the sidecar 620, the sidecar 720 also functions as a proxy that performs communication with another pod.

By using an existing distributed tracing technique, the service control unit 220 acquires an average value of the numbers of requests per unit time transmitted from each sidecar to each destination sidecar, and stores the average value in the management data storage unit 210. Examples of a tool for the distributed tracing executed in the information processing system 2 include Jaeger, Zipkin, and the like, for example.

By inputting a command, the managing server 100 instructs the master node 200 to dispose or start pods in the worker nodes 300, 400, and 500, or acquires information held in the management data storage unit 210. For example, the management data storage unit 210 holds information such as a measurement value of the number of requests between sidecars, which is acquired by the service control unit 220 from each worker node. As the command input from the managing server 100 to the master node, for example, a kubectl command is used.

Figure 5:
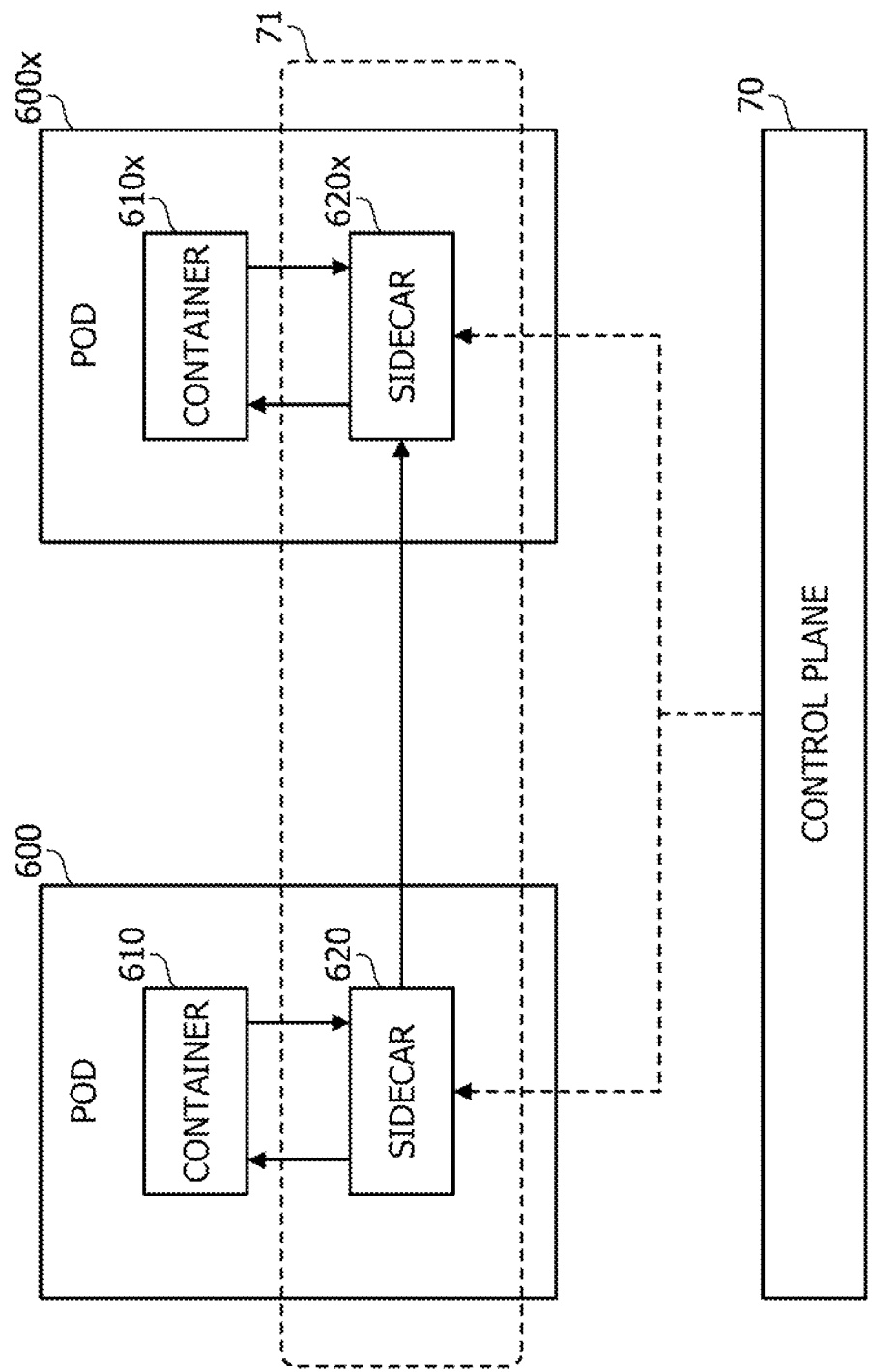
FIG. 5 is a diagram illustrating an example of communication between pods.

FIG. 5 is a diagram illustrating an example of communication between the pods.

For example, the pod 600 communicates with a pod 600x by using the sidecar 620. The pod 600x includes a container 610x and a sidecar 620x. For example, when a request is transmitted from the container 610 to the container 610x, the container 610 transfers the request to the sidecar 620. The sidecar 620 specifies a destination of a request, for example, an IP address of the sidecar 620x, and transmits the request to the sidecar 620x based on the IP address. The sidecar 620x transfers the request received to the container 610x.

Information on a transfer destination (for example, an IP address of the transfer destination) corresponding to the destination of the request by the sidecars 620 and 620x is provided from a control plane 70 to the sidecars 620 and 620x. The control plane 70 is realized by a container, and runs on each of the worker nodes 300, 400, and 500.

With respect to the control plane 70, a layer of the sidecars 620 and 620x is referred to as a data plane 71. A service mesh is realized by the control plane 70 and the data plane 71. For example, the service mesh performs communication control between services such as encryption by mutual-Transport Layer Security (mTLS), load balancing, and distributed tracing.

Examples of software that provides a service mesh on K8s include Istio, Linkerd, Dapr, and the like. Examples of a cloud service that provides a service mesh on K8s include Amazon Web Services, Inc. (AWS (registered trademark)) App Mesh, GCP Anthos (registered trademark), and the like. GCP is an abbreviation for Google Cloud Platform. Google is a registered trademark.

Which type of service mesh, for example, which type of sidecar is used is selected in accordance with a development framework used for development of a service. For this reason, different types of sidecars may coexist in the information processing system 2.

Figure 6:
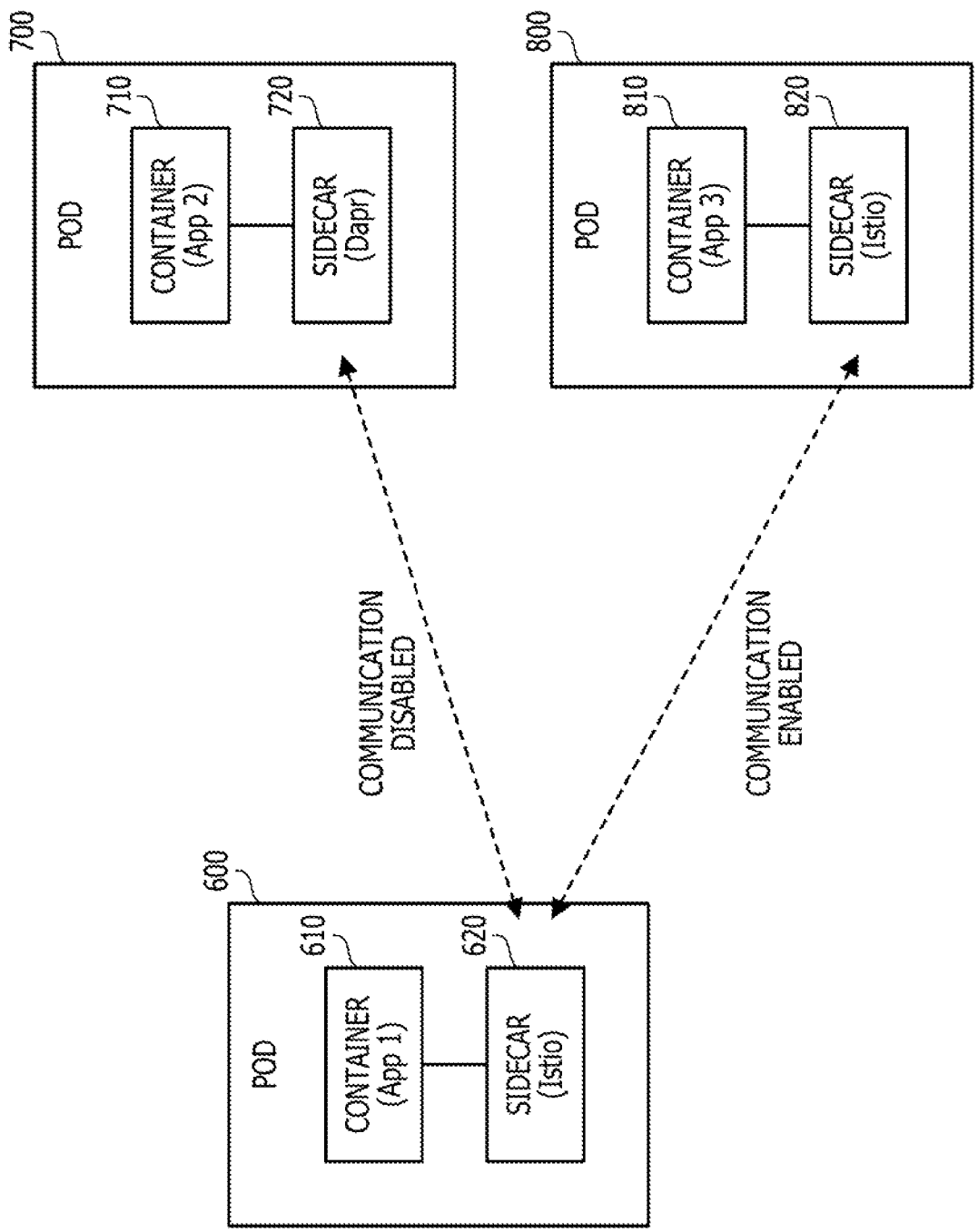
FIG. 6 is a diagram illustrating an example of whether communication is enabled or not depending on types of sidecars.

FIG. 6 is a diagram illustrating an example of whether communication is enabled or not depending on types of sidecars.

For example, a service name of the container 610 is App 1. The sidecar 620 is an Istio sidecar, for example, an Envoy sidecar. A service name of the container 710 is App 2. The sidecar 720 is a Dapr sidecar. In this case, the control plane 70 for the sidecar 620 is a control plane of Istio. For the sidecar 720 of Dapr, a control plane of Dapr is executed in each node.

A pod 800 running in the information processing system 2 includes a container 810 and a sidecar 820. A service name of the container 810 is App 3. The sidecar 820 is an Istio sidecar.

The same type of sidecars may directly communicate with each other. For example, both the sidecars 620 and 820 are Istio sidecars, and are the same type of sidecars. Accordingly, the sidecars 620 and 820 may directly communicate with each other.

On the other hand, different types of sidecars are unable to directly communicate with each other. This is because protocols for communication such as encryption are different. For example, the sidecar 620 is the Istio sidecar, but the sidecar 720 is the Dapr sidecar. For example, the sidecars 620 and 720 are the different types of sidecars. Accordingly, the sidecars 620 and 720 are unable to directly communicate with each other.

To enable cooperation between pods that are unable to directly communicate with each other, the following two communication methods are conceivable. A first method is a method in which a pod is provided that functions as a GW that relays communication between different types of sidecars, and communication between the different types of sidecars is performed via the GW. A second method is a method in which a sidecar of a type different from that of an original sidecar is caused to coexist in a pod that originates a request, and the sidecar is used for transmission of a request destined for a different type of sidecar.

Figure 7:
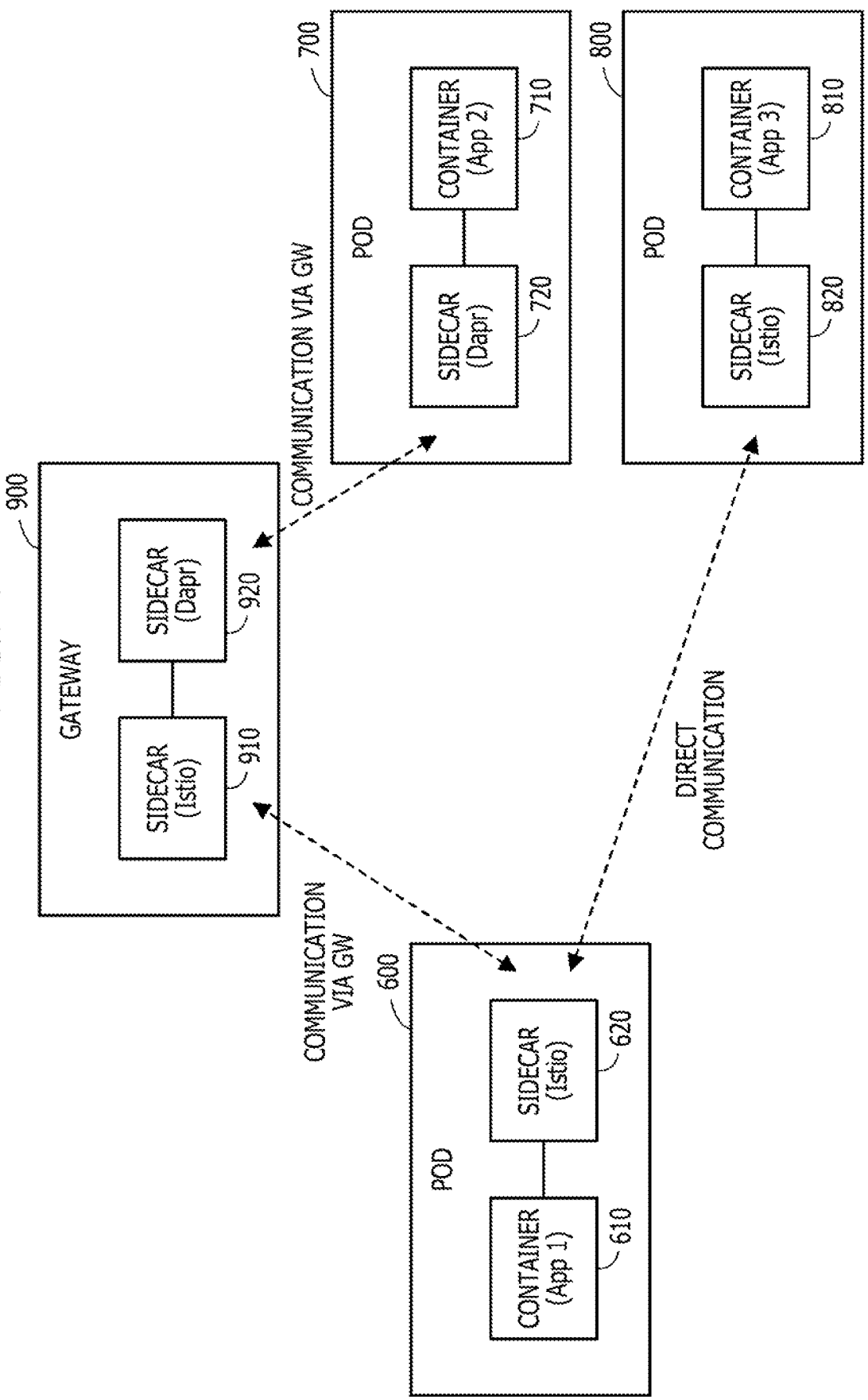
FIG. 7 is a diagram illustrating an example of communication via a gateway (GW)

FIG. 7 is a diagram illustrating an example of communication via a GW.

A gateway 900 relays communication between the pods 600 and 700. The gateway 900 includes sidecars 910 and 920. The sidecar 910 is an Istio sidecar. The sidecar 920 is a Dapr sidecar. The gateway 900 transmits, from the sidecar 920, a request received by the sidecar 910, thereby converting a communication protocol of the Istio sidecar into a communication protocol of the Dapr sidecar. Alternatively, the gateway 900 transmits a request, from the sidecar 910, received by the sidecar 920 to convert the communication protocol of the Dapr sidecar into the communication protocol of the Istio sidecar. Information on a transfer destination of a request (for example, an IP address of the transfer destination) corresponding to a request destination is provided to the gateway 900 by a control plane of a worker node that causes the gateway 900 to run. The gateway 900 may further include a container that performs processing for converting the communication protocol of the Dapr sidecar into the communication protocol of the Istio sidecar.

The sidecar 620 may transmit a request destined for the pod 700 to the gateway 900 to communicate with the pod 700 without providing a Dapr sidecar in the pod 600.

For a request destined for the pod 800, the sidecar 620 directly transmits the request to the sidecar 820.

Figure 8:
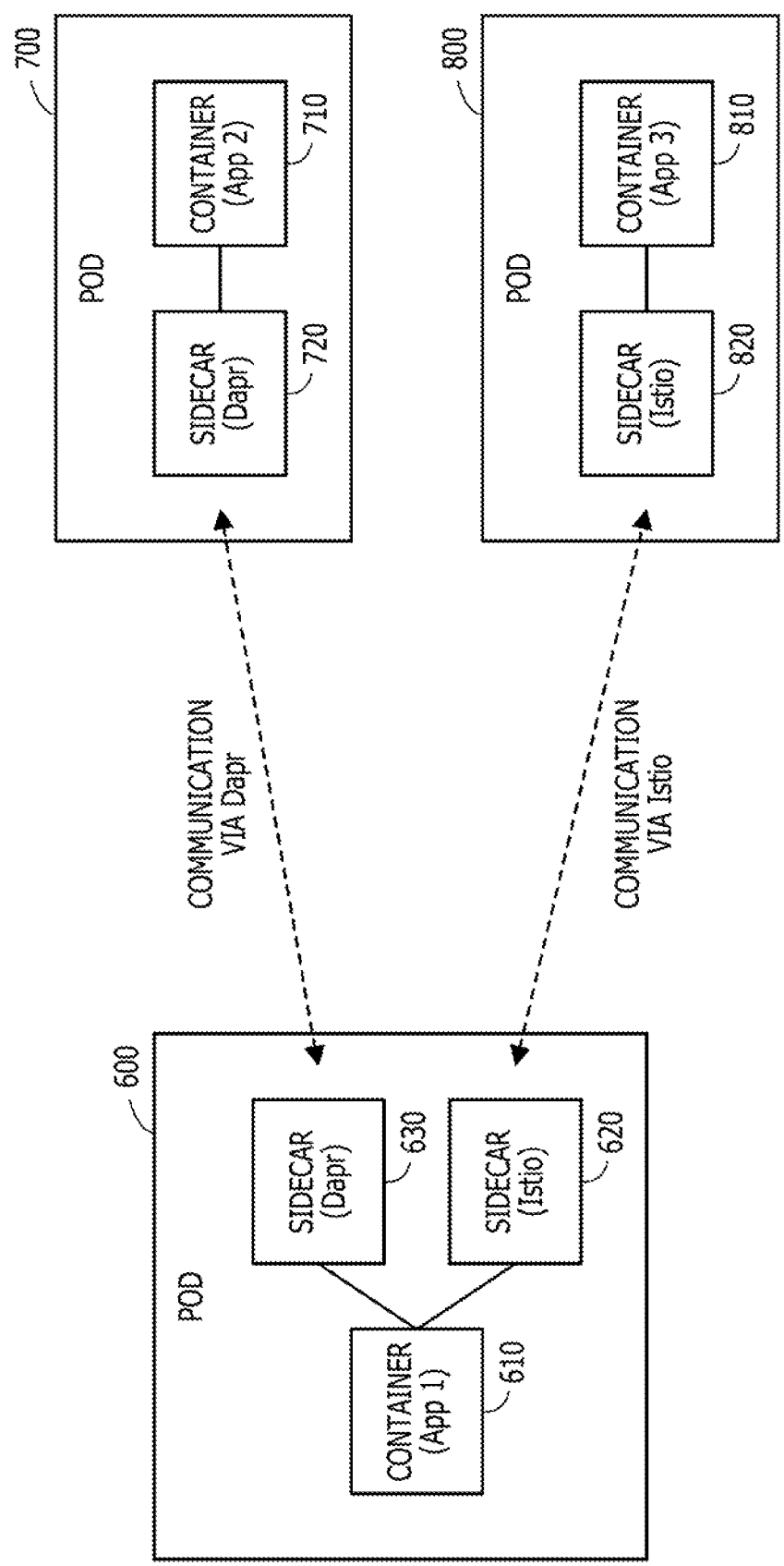
FIG. 8 is a diagram illustrating an example of communication by coexistence of different types of sidecars.

FIG. 8 is a diagram illustrating an example of communication by coexistence of different types of sidecars.

For example, the pod 600 is provided with a sidecar 630 in addition to the container 610 and the sidecar 620. The sidecar 630 is a Dapr sidecar. Accordingly, the sidecars 630 and 720 may directly communicate with each other. In this case, the container 610 may transfer a request destined for the pod 700 to the sidecar 630 to cause the request to be transmitted to the pod 700. For a request destined for the pod 800, the container 610 may transfer the request to the sidecar 620 to cause the request to be transmitted to the pod 800.

As described above, it is conceivable to enable communication between pods having respective sidecars of types different from each other by the above-described two communication methods. However, a consumed resource amount may be suppressed in the communication method via the GW as compared with the communication method in which the different types of sidecars are caused to coexist, but there is a possibility that communication is delayed due to the relay processing by the gateway 900. On the other hand, in the communication method in which the different types of sidecars are caused to coexist, a delay in communication is reduced as compared with the communication method via the GW, but resources consumed per container group increases, and a consumed resource amount may become excessive in accordance with an increase in the number of container groups disposed. In the control plane 70 as well, a consumed resource amount increases in accordance with the number of sidecars to be controlled. For example, a consumed resource amount by the control plane 70 for executing 1000 services and 2000 sidecars corresponds to one CPU and a memory of approximately 1.5 GB. A CPU allocated to each pod or the control plane 70 may be a virtual CPU (vCPU).

Accordingly, the managing server 100 provides a function of selectively using the communication method via the GW or the communication method in which the different types of sidecars are caused to coexist.

Figure 9:
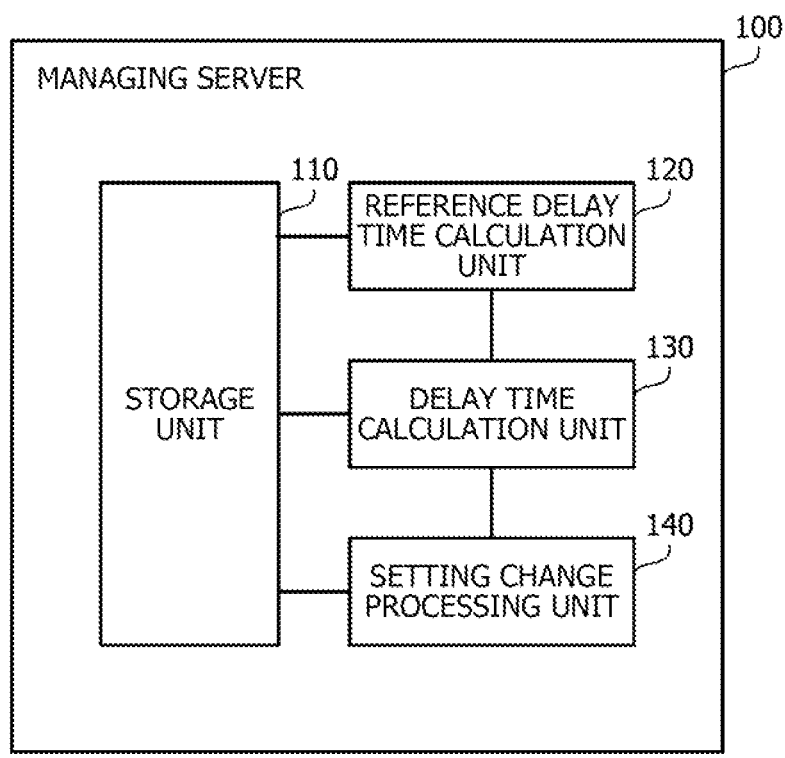
FIG. 9 is a diagram illustrating a functional example of the managing server.

FIG. 9 is a diagram illustrating a functional example of the managing server.

The managing server 100 includes a storage unit 110, a reference delay time calculation unit 120, a delay time calculation unit 130, and a setting change processing unit 140. A storage area of the RAM 102 or the HDD 103 is used for the storage unit 110. Each of the reference delay time calculation unit 120, the delay time calculation unit 130, and the setting change processing unit 140 is realized by the CPU 101 executing a program stored in the RAM 102.

The storage unit 110 stores, regarding delay time due to processing of various sidecars, performance information made public by providers of the sidecars or the like. For the various sidecars, the performance information includes information on delay time corresponding to the predetermined number of requests per unit time. For example, the performance information may be acquired from a web page of a vendor that is a provider of the sidecar, or the like. According to this example, unit time is one second. Based on the performance information, the storage unit 110 stores information on reference delay time calculated by the reference delay time calculation unit 120. The storage unit 110 stores information on delay time calculated for each sidecar for the current number of requests.

The reference delay time calculation unit 120, based on information on delay time corresponding to the predetermined number of requests/s included in the performance information, calculates reference delay time related to request transmission of each pod. The number of requests/s indicates the number of requests per second. Delay time in communication with a sidecar increases in proportion to the number of requests to be transmitted per second. The reference delay time calculation unit 120 calculates, for a certain pod, delay time when transmission is performed with the current number of requests/s by using an original single sidecar, as reference delay time for the pod.

Based on the number of requests to be transmitted by each pod to a different type of sidecar per second, the delay time calculation unit 130 calculates delay time when the requests are transmitted via a GW. When a request is transmitted via the GW, the delay time calculation unit 130 adds delay time in a sidecar of a pod that originates a request to delay time in each of the sidecars 910 and 920 of the gateway 900, to calculate delay time in the case of via the GW.

For each pod, the setting change processing unit 140 compares the reference delay time calculated by the reference delay time calculation unit 120 with delay time calculated by the delay time calculation unit 130, to select a communication method to be used to transmit a request destined for a different type of sidecar from the pod. When the delay time via the GW is shorter than the reference delay time, the setting change processing unit 140 selects the communication method via the GW. On the other hand, when the delay time via the GW is equal to or longer than the reference delay time, the setting change processing unit 140 selects the communication method in which the different types of sidecars are caused to coexist. According to the selected communication method, the setting change processing unit 140 instructs the master node 200 to change a configuration of a pod. As will be described later, a configuration change of a pod involves addition of a new sidecar or deletion of an existing sidecar. For example, the setting change processing unit 140 changes image data corresponding to the pod 600 held by the master node 200, in accordance with addition of a new sidecar to the pod 600 or deletion of an existing sidecar from the pod 600. The image data is used by the master node 200 to dispose the pod 600.

When the method via the GW is selected for transmission of a request destined for the pod 700 from the pod 600, the setting change processing unit 140 performs routing setting for the pod 600 for transmitting the request to the gateway 900. As will be described later, the setting change processing unit 140 may provide an Istio sidecar for transmitting a request via the GW in the pod 600, separately from the sidecar 620.

When coexistence of different types of sidecars is selected for transmission of a request destined for the pod 700 from the pod 600, the setting change processing unit 140 adds the sidecar 630 to the pod 600. The setting change processing unit 140 performs routing setting for the pod 600 for transmitting a request destined for the pod 700 from the pod 600 by using the sidecar 630.

For example, when a new pod is added on a worker node, or at a predetermined cycle, the setting change processing unit 140 sets a communication method used by the new pod, or resets a communication method used by an existing pod. A length of the predetermined cycle is, for example, one hour, one day, or the like. By resetting the communication method, for the existing pod, the communication method via the GW may be changed to the communication method in which the different types of sidecars are caused to coexist, or conversely, the communication method in which the different types of sidecars are caused to coexist may be changed to the communication method via the GW.

When the communication method is changed in accordance with the selection of the method via the GW or the method by coexistence of the different types of sidecars, a configuration change such as addition of a sidecar to a pod or deletion of a sidecar from the pod is involved. In this case, the setting change processing unit 140 instructs the master node 200 to perform a procedure such as redisposition of a pod, for example, undeployment of a pod, and deployment of a pod after the configuration change. For example, when there are a plurality of pods that execute the same service, the setting change processing unit 140 may perform rolling update or blue-green deployment to dispose the pods again without stopping the service.

FIG. 10 is a diagram illustrating an example of a sidecar information table.

A sidecar information table 111 is stored in the storage unit 110 in advance. The sidecar information table 111 is performance information made public by providers of various sidecars. The sidecar information table 111 includes items of a sidecar type, an item name, and a value. A type of sidecar is registered with the item of sidecar type. An item name of performance is registered with the item of item name. A performance value is registered with the item of value.

For example, the sidecar information table 111 has a record of the sidecar type "Istio", the item name "resource used when 1000 req/s", and the value "CPU: 0.35, memory: 40 megabytes (MB)". The record indicates that, in an Istio sidecar, when the number of requests transmitted per second is 1000, 0.35 CPUs and 40 MB of memory (RAM) are used.

The sidecar information table 111 has a record of the sidecar type "Istio", the item name "delay time when 1000 req/s", and the value "2.65 milliseconds (ms)". The record indicates that, in the Istio sidecar, when the number of requests transmitted per second is 1000, a delay of 2.65 ms occurs.

The sidecar information table 111 has a record of the sidecar type "Dapr", the item name "resource used when 1000 req/s", and the value "CPU: 0.48, memory: 23 MB". The record indicates that, in the Dapr sidecar, when the number of requests transmitted per second is 1000, 0.48 CPUs and 23 MB of memory are used.

The sidecar information table 111 has a record of the sidecar type "Dapr", the item name "delay time when 1000 req/s", and the value "1.40 ms". The record indicates that, in the Dapr sidecar, when the number of requests transmitted per second is 1000, a delay of 1.40 ms occurs.

Even for a sidecar of a type other than Istio and Dapr, information on resources used and delay time made public by a provider of the sidecar may be registered with the sidecar information table 111.

Figure 11:
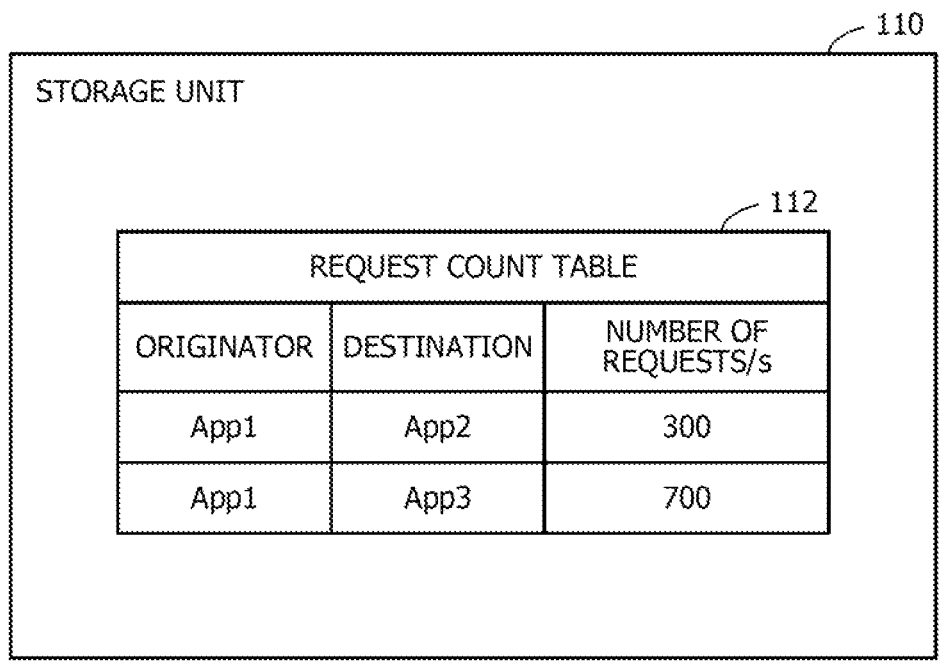
FIG. 11 is a diagram illustrating an example of a request count table.

FIG. 11 is a diagram illustrating an example of a request count table.

A request count table 112 is information in which an average value of the numbers of requests transmitted from an originating service to a destination service per unit time (the number of requests/s) is recorded. The information in the request count table 112 is acquired from the master node 200 by the reference delay time calculation unit 120 and is stored in the storage unit 110.

The request count table 112 includes items of an originator, a destination, and the number of requests/s. As identification information of an originating pod, an identification name of a service in the originating pod is registered with the item of originator. An identification name of a service in a destination pod is registered with the item of destination. An average value of the numbers of requests transmitted from the originator to the destination per second is registered with the item of the number of requests/s. For example, the average value is acquired based on the number of requests transmitted from the originator to the destination in a latest predetermined period.

For example, the request count table 112 has a record of the originator "App 1", the destination "App 2", and the number of requests/s "300". The record indicates that 300 requests are transmitted from the pod 600 to the pod 700 per second.

The request count table 112 has a record of the originator "App 1", the destination "App 3", and the number of requests/s "700". The record indicates that 700 requests are transmitted from the pod 600 to the pod 800 per second.

For another pair of an originator and a destination as well, the number of requests/s may be registered with the request count table 112.

Figure 12:
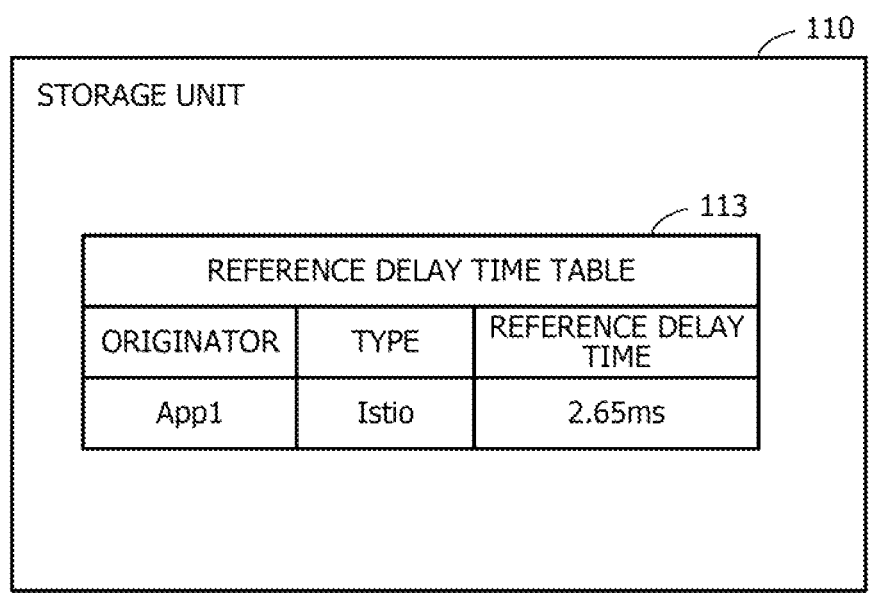
FIG. 12 is a diagram illustrating an example of a reference delay time table.

FIG. 12 is a diagram illustrating an example of a reference delay timetable.

A reference delay timetable 113 is generated by the reference delay time calculation unit 120 based on the request count table 112, and is stored in the storage unit 110. The reference delay timetable 113 includes items of an originator, a type, and reference delay time. An identification name of a service in an originating pod is registered with the item of originator. A type of sidecar running in the pod is registered with the item of type. Reference delay time when a request is transmitted from the pod to a destination pod is registered with the item of reference delay time.

For example, the reference delay timetable 113 has a record of the originator "App 1", the type "Istio", and the reference delay time "2.65 ms". The record indicates that a type of sidecar of the pod 600 is "Istio", and reference delay time is 2.65 ms.

The reference delay time calculation unit 120 calculates reference delay time for the pod 600 based on the request count table 112 as follows. First, the reference delay time calculation unit 120 calculates the total number of requests transmitted by the pod 600 per unit time based on the request count table 112. For example, the reference delay time calculation unit 120 calculates the total number of requests transmitted by the pod 600 per second as 300+700=1000/s.

Based on the sidecar information table 111, the reference delay time calculation unit 120 calculates, as reference delay time, delay time when transmission is performed with the total number of requests/s by using the single sidecar 620 originally included in the pod 600. For example, the delay time of the sidecar increases in proportion to the number of requests transmitted per second. The type of sidecar 620 is Istio. According to the sidecar information table 111, the "delay time when 1000 req/s" of the Istio sidecar is 2.65 ms. "1000 req/s" in "delay time when 1000 req/s" in the sidecar information table 111 is denoted as A, and the total number of requests/s calculated for the pod 600 by the reference delay time calculation unit 120 is denoted as B. The reference delay time calculation unit 120 calculates reference delay time for the pods 600 as (B/A)*2.65=(1000/1000)*2.65=2.65 ms.

Reference delay time may also be registered for another pod with the reference delay timetable 113.

Figure 13:
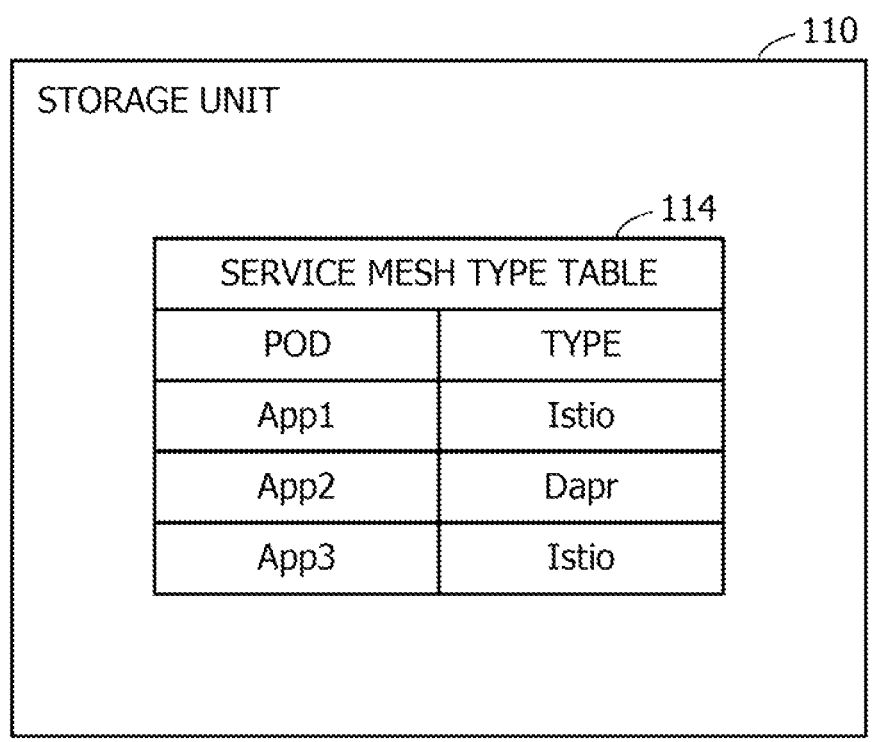
FIG. 13 is a diagram illustrating an example of a service mesh type table.

FIG. 13 is a diagram illustrating an example of a service mesh type table.

A service mesh type table 114 is acquired from the master node 200 by the reference delay time calculation unit 120, and is stored in the storage unit 110. The service mesh type table 114 includes items of a pod and a type. An identification name of a service in a pod is registered with the item of pod. A service mesh type used in the pod, for example, a type of a sidecar used for a service mesh is registered with the item of type.

For example, the service mesh type table 114 has a record of the pod "App 1" and the type "Istio". The record indicates that a type of sidecar of the pod 600 is "Istio".

A record indicating that a type of sidecar of the pod 700 is "Dapr", and a record indicating that a type of sidecar of the pod 800 is "Istio" are also registered with the service mesh type table 114.

FIG. 14 is a diagram illustrating an example of a request-count-per-service-mesh-type table.

A request-count-per-service-mesh-type table 115 is generated by the delay time calculation unit 130 based on the request count table 112 and the service mesh type table 114, and is stored in the storage unit 110. The request-count-per-service-mesh-type table 115 includes items of an originator, an originator type, a destination type, and the number of requests/s.

An identification name of a service in an originating pod is registered with the item of originator. A type of sidecar in an originating pod is registered with the item of originator type. A type of sidecar in a destination pod is registered with the item of destination type. The number of requests transmitted from the originating pod to the destination pod per second is registered with the item of the number of requests/s.

For example, the request-count-per-service-mesh-type table 115 has a record of the originator "App 1", the originator type "Istio", the destination type "Dapr", and the number of requests/s "300". The record indicates that 300 requests are transmitted per second from the pod 600 to the pod 700 having a sidecar of a destination type of Dapr.

The request-count-per-service-mesh-type table 115 has a record of the originator "App 1", the originator type "Istio", the destination type "Istio", and the number of requests/s "700". The record indicates that 700 requests are transmitted per second from the pod 600 to the pod 800 having a sidecar of a destination type of Istio.

For another originating pod as well, the number of requests per unit time may be registered for each destination type with the request-count-per-service-mesh-type table 115.

Figure 15:
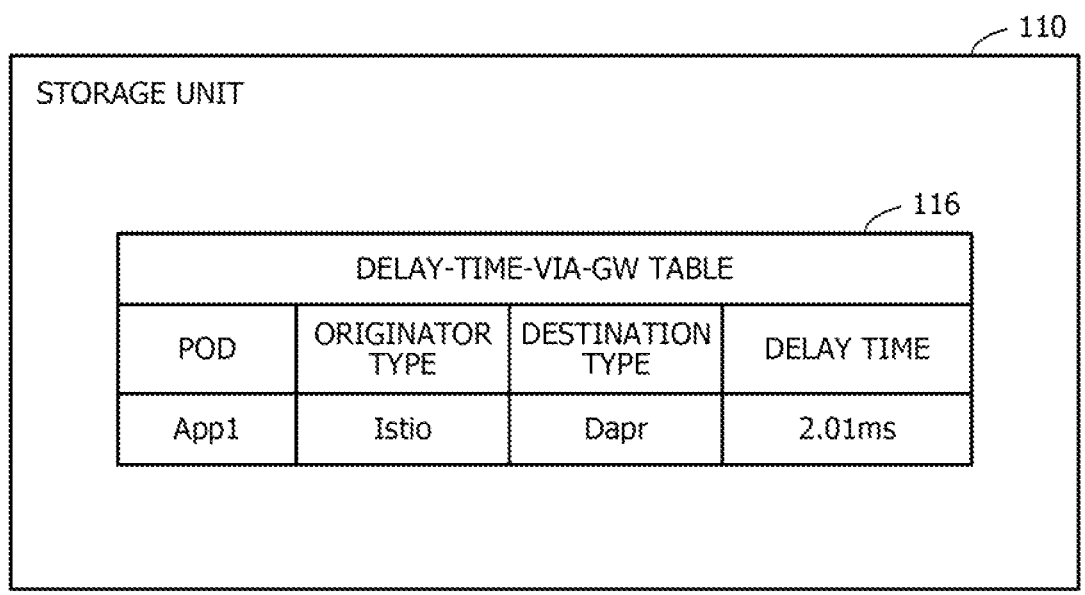
FIG. 15 is a diagram illustrating an example of a delay-time-via-GW table.

FIG. 15 is a diagram illustrating an example of a delay-time-via-GW table.

A delay-time-via-GW table 116 is generated by the delay time calculation unit 130 based on the request-count-per-service-mesh-type table 115, and is stored in the storage unit 110. The delay-time-via-GW table 116 includes items of a pod, an originator type, a destination type, and delay time.

An identification name of a service in an originating pod is registered with the item of pod. A type of sidecar in an originating pod is registered with the item of originator type. A type of sidecar in a destination pod is registered with the item of destination type. Delay time when a request is transmitted from the originating pod to the destination pod via the gateway 900 is registered with the item of delay time.

For example, the delay-time-via-GW table 116 has a record of the pod "App 1", the originator type "Istio", the destination type "Dapr", and the delay time "2.01 ms". The record indicates that delay time when a request from the pod 600 to the pod 700 is transmitted via the gateway 900 is 2.01 ms.

The delay time calculation unit 130 calculates delay time when a request is transmitted from the pod 600 to the pod 700 via the GW, as follows.

First, based on the request-count-per-service-mesh-type table 115, the delay time calculation unit 130 specifies that the type "Dapr" of a destination sidecar exists for the type "Istio" of the sidecar of the pod 600. Accordingly, the delay time calculation unit 130 specifies that the request transmission via the GW passes through the gateway having the Istio sidecar and the Dapr sidecar. Based on the request-count-per-service-mesh-type table 115, the delay time calculation unit 130 specifies that the number of requests from the pod 600 to the Dapr sidecar is 300/s.

In this case, the request transmitted from the pod 600 to the pod having the Dapr sidecar reaches the destination pod via the Istio sidecar of the pod 600, the Istio sidecar of the gateway, and the Dapr sidecar of the gateway. Accordingly, based on the sidecar information table 111, the delay time calculation unit 130 calculates (300/1000)*2.65+(300/1000)*2.65+(300/1000)*1.40=2.01 ms as the delay time via the GW.

Although the case where one gateway relays a request from one originating pod has been described in the above calculation example, one gateway may relay requests from a plurality of originating pods. When one gateway relays requests from a plurality of originating pods, the delay time calculation unit 130 uses, the total number of requests relayed by the gateway in the term of delay time related to the sidecar of the gateway, in the above calculation formula.

For another pod as well, delay time via a GW when a request is transmitted to a destination pod having a different type of sidecar may be registered with the delay-time-via-GW table 116.

Figure 16:
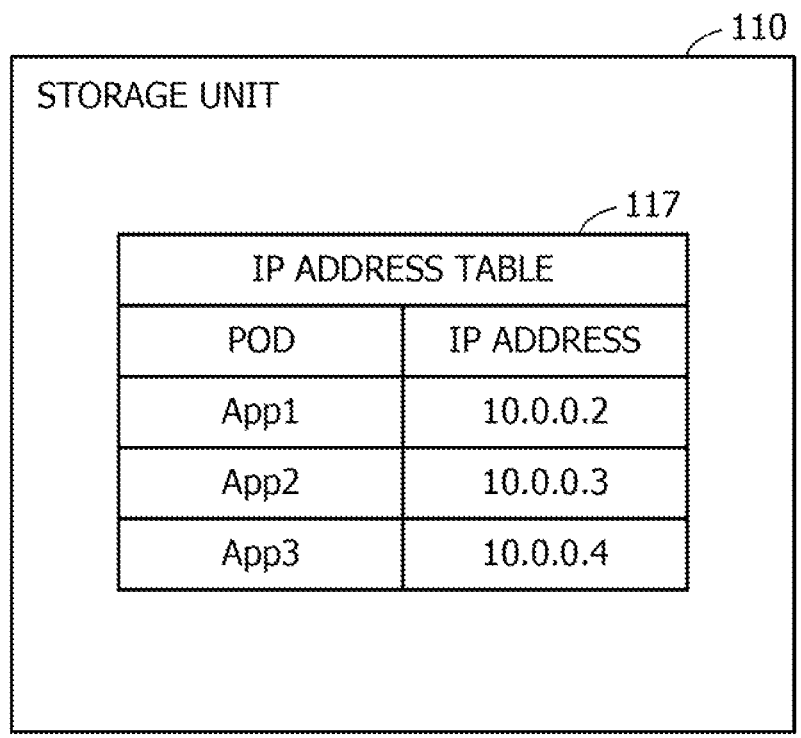
FIG. 16 is a diagram illustrating an example of an Internet Protocol (IP) address table.

FIG. 16 is a diagram illustrating an example of an IP address table.

An IP address table 117 is information indicating an IP address of each pod. The IP address table 117 is generated by the setting change processing unit 140. The setting change processing unit 140 acquires an IP address of each pod from the master node 200, and registers the IP address with the IP address table 117. The IP address table 117 includes items of a pod and an IP address. An identification name of a service in a pod is registered with the item of pod. An IP address is registered with the item of IP address.

For example, the IP address table 117 has a record of the pod "App 1" and the IP address "10.0.0.2". The record indicates that an IP address of the pod 600 is 10.0.0.2. The IP address table 117 also has a record indicating that an IP address of the pod 700 is 10.0.0.3, and a record indicating that an IP address of the pod 800 is 10.0.0.4.

Figure 17:
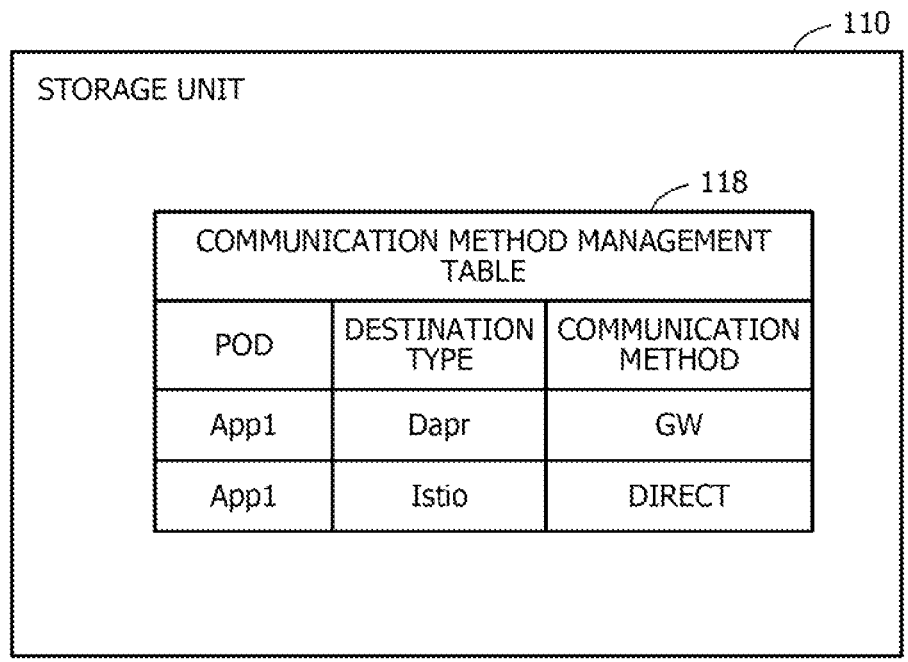
FIG. 17 is a diagram illustrating an example of a communication method management table.

FIG. 17 is a diagram illustrating an example of a communication method management table.

A communication method management table 118 is information used for managing a communication method when a request is transmitted from a certain pod to a destination pod. The communication method management table 118 includes items of a pod, a destination type, and a communication method.

An identification name of a service in a pod is registered with the item of pod. A type of sidecar included in a destination pod is registered with the item of destination type. A communication method used for transmitting a request from the pod to the destination pod is registered with the item of communication method. As the communication methods, there are "GW" and "direct". "GW" indicates that a request is transmitted via a GW. "Direct" indicates that a request is directly transmitted from a sidecar of an originating pod to a sidecar of a destination pod, not via a GW.

For example, the communication method management table 118 has a record of the pod "App 1", the destination type "Dapr", and the communication method "GW". The record indicates that a request from the pod 600 to the pod 700 having the Dapr sidecar is transmitted via a GW.

The communication method management table 118 has a record of the pod "App 1", the destination type "Istio", and the communication method "direct". The record indicates that a request is directly transmitted from the pod 600 to the pod 800 having the Istio sidecar.

When the sidecar 630 of Dapr is provided in the pod 600, and the sidecar 630 is used to directly communicate with the pod 700, a communication method corresponding to the pod "App 1" and the destination type "Dapr" is "direct".

A communication method for each destination type may be registered for another pod as well with the communication method management table 118.

Figure 18:
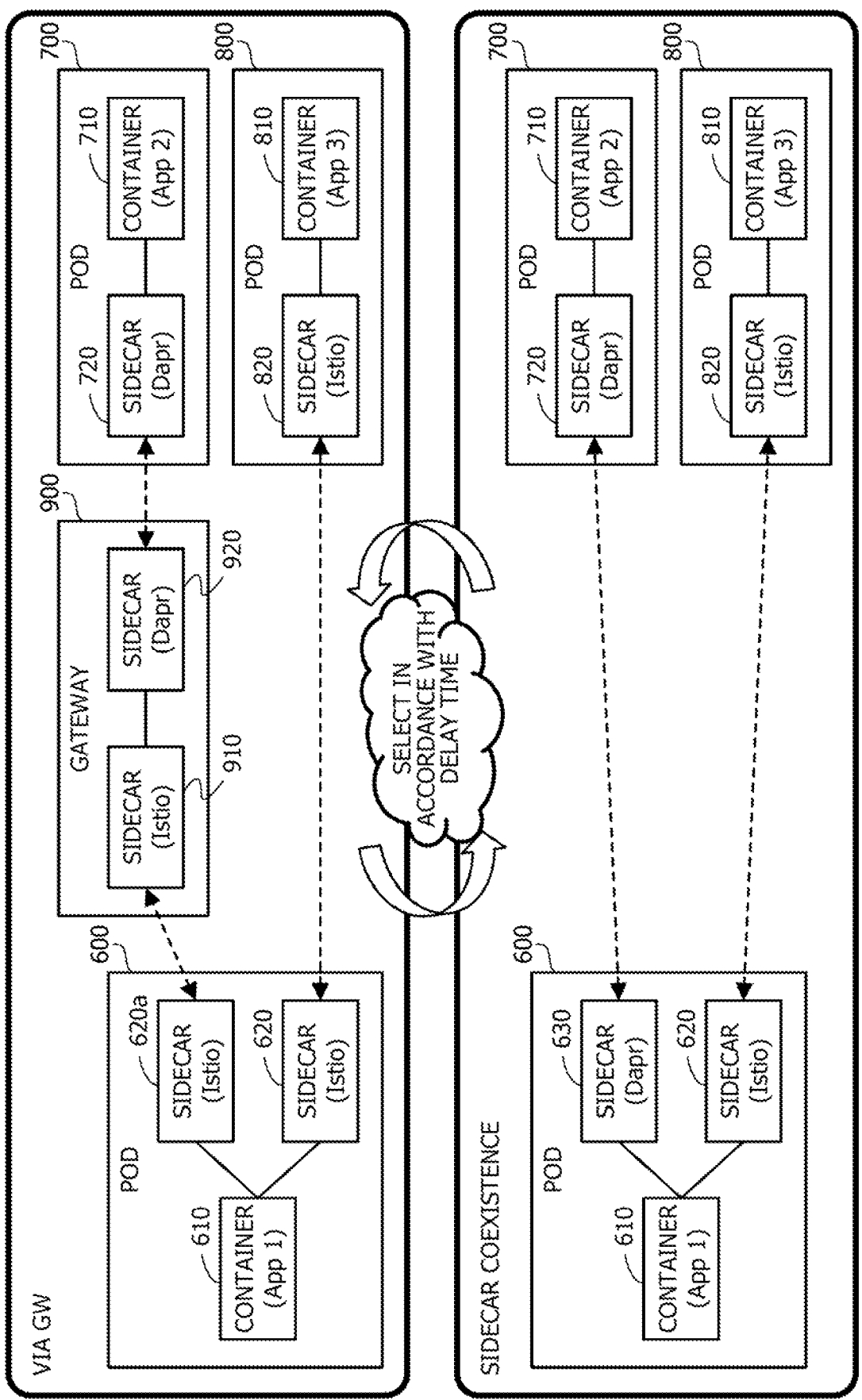
FIG. 18 is a diagram illustrating an example of respective communication routes in a case of via a GW and in a case of sidecar coexistence.

FIG. 18 is a diagram illustrating an example of respective communication routes in a case of via a GW and in a case of sidecar coexistence.

For example, when the pod 600 and the pod 700 communicate with each other via a GW, the gateway 900 relays between the pods 600 and 700. Direct communication between the pods 600 and 800 is possible by the sidecars 620 and 820 of the same type.

In a case of sidecar coexistence in which the sidecar 630 of the different type is added to the pod 600 separately from the sidecar 620 and is used for communication with the pod 700, direct communication between the pods 600 and 700 is possible by the sidecars 630 and 720 of the same type. Direct communication between the pods 600 and 800 is possible by the sidecars 620 and 820 of the same type.

The setting change processing unit 140 selects whether communication between the pods 600 and 700 is performed via a GW or by coexistence of different types of sidecars, in accordance with comparison between delay time in a case of via a GW in accordance with the number of requests per unit time from the pod 600 to the pod 700, and reference delay time. A library for cooperating with a plurality of types of sidecars, an API call logic, and the like are mounted in the container 610 in advance.

When the method via the GW is used, the setting change processing unit 140 provides a sidecar 620*a* that transmits a request destined for the pod 700 to the gateway 900 in the pod 600 separately from the sidecar 620. The sidecar 620*a* is an Istio sidecar. As described above, the sidecar 620 directly transmits a request destined for the pod 800 to the sidecar 820. As described above, by separately providing the sidecar 620*a* that transmits a request destined for the gateway 900, it is possible to reduce delay time of communication, compared with a case where the request is transferred using only the sidecar 620. For example, since sidecar 620*a* is provided separately from the sidecar 620, the setting change processing unit 140 may suppress a deviation between delay time calculated in advance as the case of via the GW during operation with the sidecar coexistence, and delay time when the method via the GW is actually used afterward.

A consumed resource amount of a sidecar increases as the number of requests processed in a unit time increases. Even when the sidecar 620*a* is provided separately from the sidecar 620, requests are shared by the sidecars 620 and 620*a*. For this reason, a consumed resource amount by the pod 600 for running both the sidecars 620 and 620*a* is suppressed to a level slightly higher than that when the sidecar 620 alone is used, and is lower than a resource amount in the case where the sidecar 620 and the different type of sidecar 630 are caused to coexist.

It is conceivable that, without providing the sidecar 620*a* destined for the GW in the pod 600, a transfer destination of a request destined for each of the GW and the pod 800 is determined by the sidecar 620 alone. For example, in this case, the reference delay time calculation unit 120 determines a value obtained by multiplying the reference delay time (for example, a value of 2.65 ms) calculated by the method described with reference to FIG. 12 by a coefficient greater than 1 as reference delay time for the pod. When calculating delay time in the case of via the GW, the delay time calculation unit 130 calculates delay time due to the sidecar 620 by using the total number of requests transmitted by the pod 600, adds the calculated delay time to delay time in the gateway 900, to determines delay time in the case of via the GW. As described above, the managing server 100 may be configured not including the sidecar 620*a*. When the communication destined for the GW and the direct communication destined for the pod 800 are switched by the sidecar 620 alone in the pod 600, the setting change processing unit 140 may set information on a transfer destination of a request in accordance with a destination of the request for the sidecar 620 via a control plane of Istio.

The setting change processing unit 140 may change the method of via the GW to the method of the sidecar coexistence, or the method of the sidecar coexistence to the method via the GW. For example, when the method of via the GW is changed to the method of the sidecar coexistence, the setting change processing unit 140 may set, for the sidecar 630 added to the pod 600, information on a transfer destination of a request destined for the pod 700, via a control plane of Dapr. When the method of the sidecar coexistence is changed to the method of via the GW, the setting change processing unit 140 may set, for the sidecar 620*a* added to the pod 600, via a control plane of Istio, information on a transfer destination of a request destined for the pods 700. When the method of the sidecar coexistence is changed to the method of via the GW, the setting change processing unit 140 may set, for the sidecar 920, via a control plane of Dapr, information on a transfer destination of a request destined for the pod 700.

Next, routing setting inside the pod 600 by the setting change processing unit 140 will be described. First, routing setting when a request is transmitted to the pod 700 via the sidecar 620*a* and a GW will be described.

Figure 19:
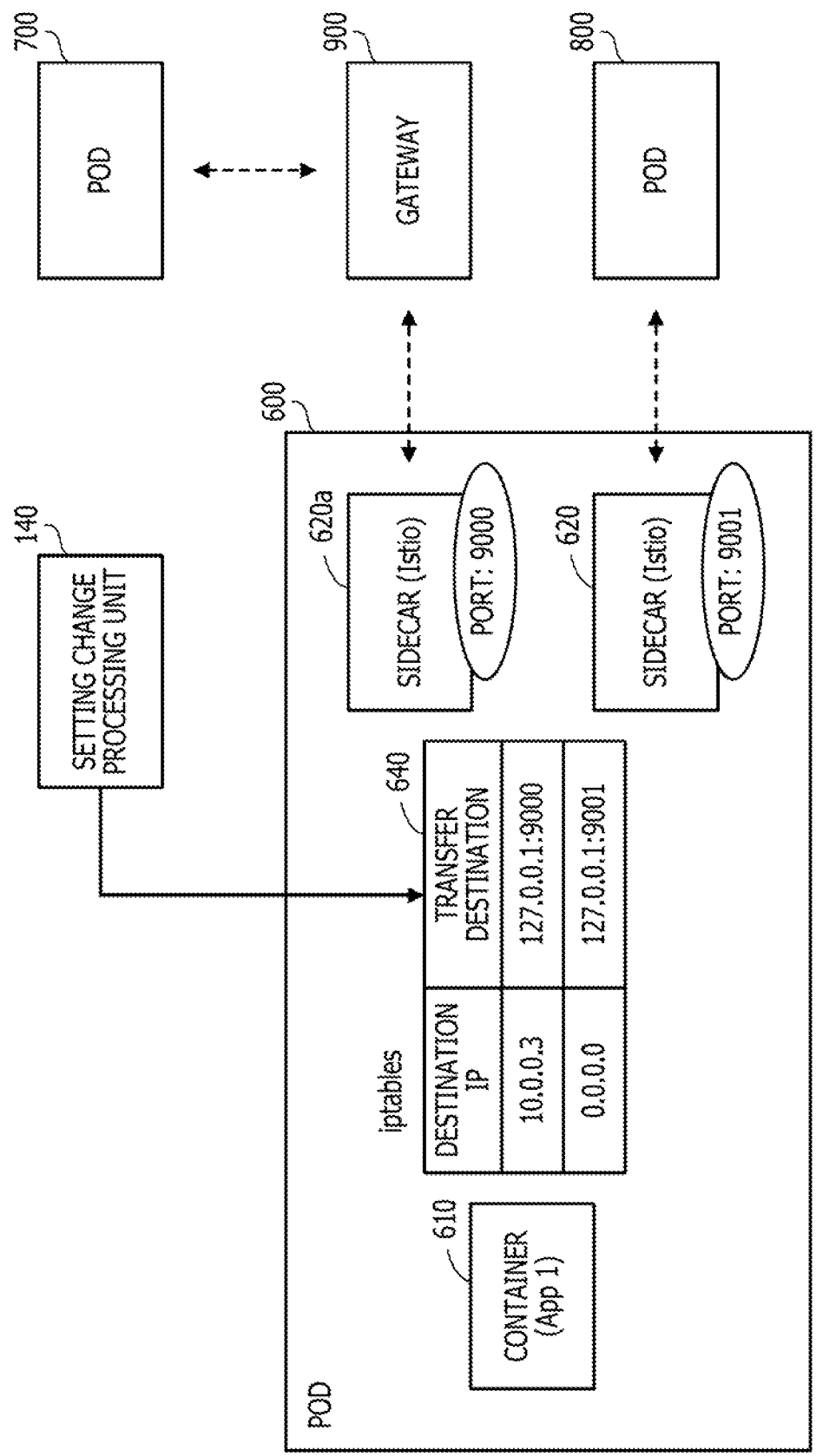
FIG. 19 is a diagram illustrating an example of routing setting in a case of via a GW.

FIG. 19 is a diagram illustrating an example of routing setting in a case of via a GW.

The setting change processing unit 140 registers information indicating a sidecar of a transfer destination for each destination IP with a transfer destination table 640 of iptables held by the pod 600. The transfer destination table 640 is used to determine a transfer destination of a request by the container 610. The transfer destination table 640 includes items of a destination IP address and a transfer destination.

An IP address of a pod serving as a destination of a request is registered with the item of destination IP. Information indicating a sidecar of a transfer destination of the request corresponding to the destination is registered with the item of transfer destination. The information indicating the sidecar of the transfer destination is a set of a local host address "127.0.0.1" and a port number. For example, the sidecars 620 and 620*a* existing inside the pod 600 are distinguished from each other with the port numbers, by the container 610. As an example, the port number corresponding to the sidecar 620*a* is "9000". The port number corresponding to the sidecar 620 is "9001".

For example, the setting change processing unit 140 acquires an IP address "10.0.0.3" of the pod 700 as a destination having a Dapr sidecar based on the IP address table 117. The setting change processing unit 140 sets "10.0.0.3" in the item of destination IP in the transfer destination table 640, and sets "127.0.0.1:9000" in the item of transfer destination for the destination IP. Under control of the control plane 70, the sidecar 620*a* transmits the request transferred from the container 610 to the gateway 900. For example, the setting change processing unit 140 may set, for the sidecar 620*a*, rule information for setting the transfer destination of the request from the container 610 as the gateway 900, via the control plane 70.

The setting change processing unit 140 sets a default route "0.0.0.0" in the item of destination IP in the transfer destination table 640, and sets "127.0.0.1:9001" in the item of transfer destination for the default route. Accordingly, a request having a destination IP address other than "10.0.0.3" is transferred from the container 610 to the sidecar 620.

Next, routing setting when a request is directly transmitted to the pod 700 via the sidecar 630 will be described.

Figure 20:
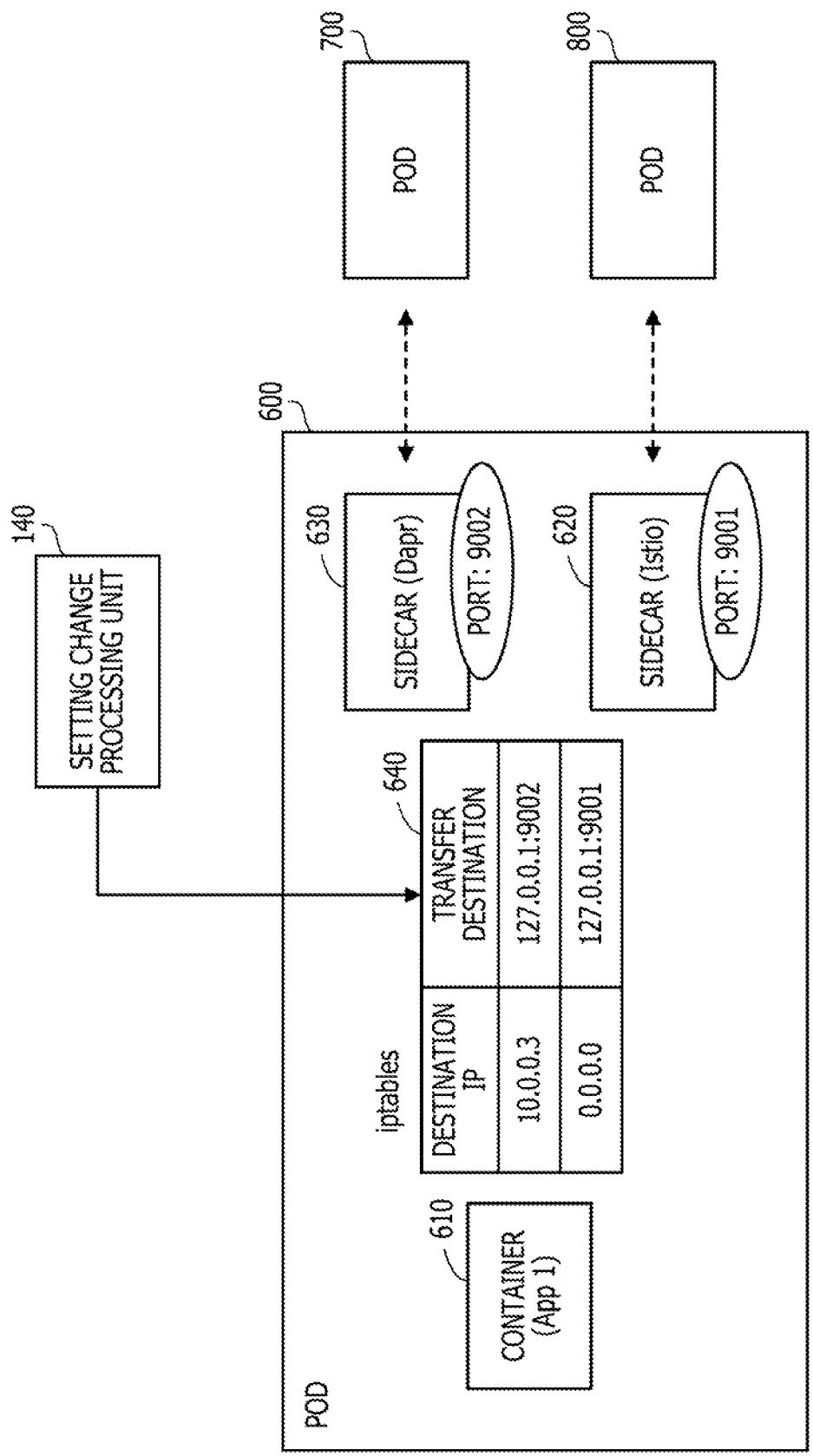
FIG. 20 is a diagram illustrating an example of routing setting when different types of sidecars coexist.

FIG. 20 is a diagram illustrating an example of routing setting when different types of sidecars coexist.

In this example, a port number corresponding to the sidecar 630 is "9002". In this case, the setting change processing unit 140 sets a transfer destination "127.0.0.1:9002" for a destination IP "10.0.0.3" in the transfer destination table 640. Under control of a control plane of Dapr, the sidecar 630 transmits a request transferred from the container 610, to the pod 700. For example, the setting change processing unit 140 may set, for the sidecar 630, rule information for setting a transfer destination of a request from the container 610 as the pod 700, via the control plane of Dapr. For a default route "0.0.0.0", the setting change processing unit 140 sets a transfer destination "127.0.0.1: 9001" as in the same manner in FIG. 19.

As described above, the setting change processing unit 140 may, depending on whether to use the transmission via a GW or direct transmission by coexistence of different types of sidecars, change setting in the transfer destination table 640, to control a transmission route of a request by the container 610.

The setting change processing unit 140 may perform setting change for the pod 600 illustrated in FIGS. 19 and 20 via the master node 200.

Next, a processing procedure by the managing server 100 will be described.

Figure 21:
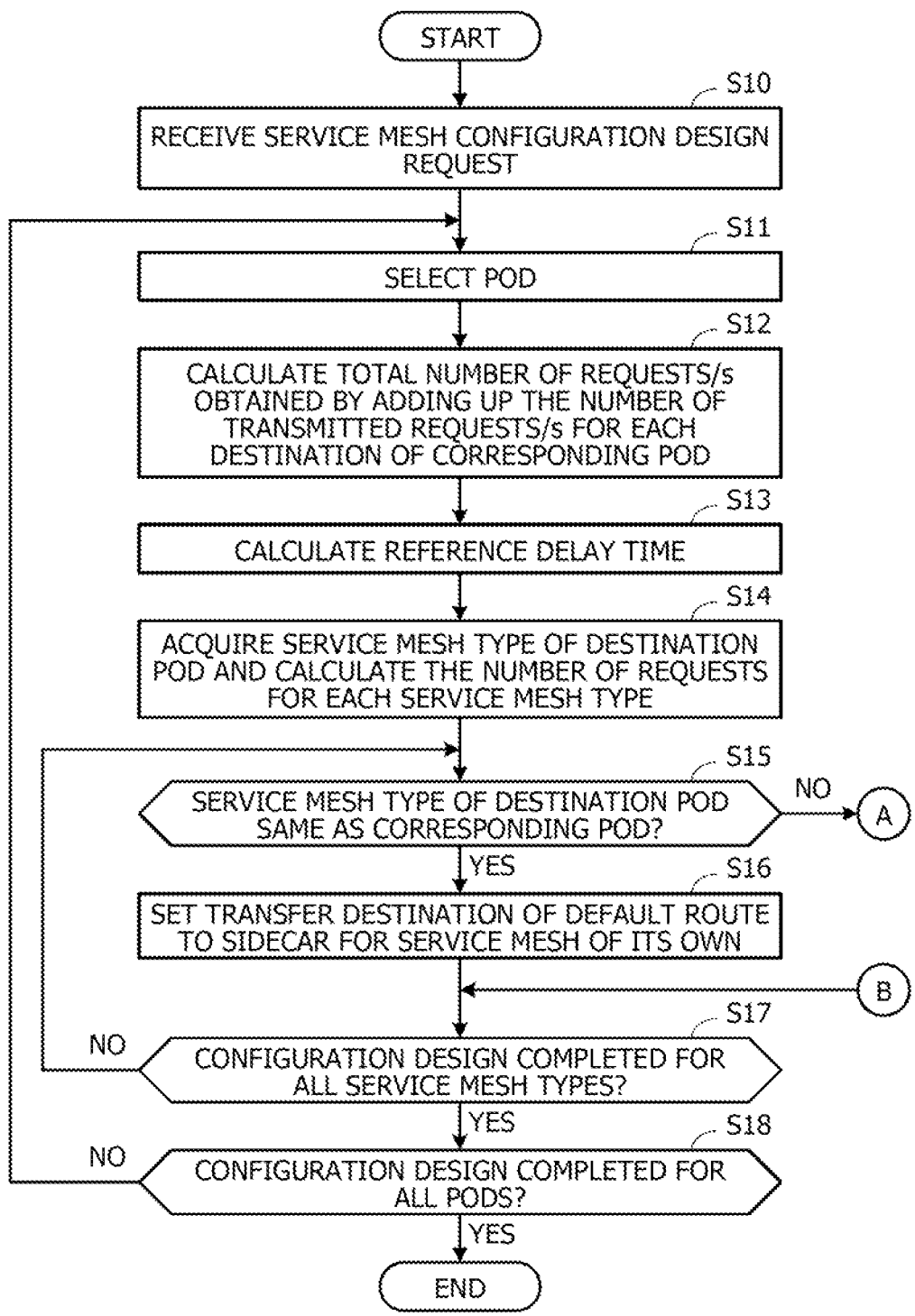
FIG. 21 is a flowchart illustrating a processing example of the managing server.

FIG. 21 is a flowchart illustrating a processing example of the managing server.

(S10) The reference delay time calculation unit 120 receives a service mesh configuration design request. The service mesh configuration design request is input to the managing server 100, when a new pod is disposed in any of worker nodes, or at a predetermined cycle.

(S11) The reference delay time calculation unit 120 selects one pod to be processed. Selection candidates for the pod to be processed include pods already running. When a new pod is disposed, the selection candidates for the pod to be processed include the new pod. The pod to be processed selected in step S11 is denoted as the corresponding pod in the following steps.

(S12) The reference delay time calculation unit 120 acquires, from the master node 200, the number of requests transmitted by the corresponding pod per second for each destination, and registers the number of requests/s with the request count table 112. The reference delay time calculation unit 120 calculates the total number of requests/s obtained by adding up the number of requests transmitted per second for each destination of the corresponding pod.

It is conceivable that when the corresponding pod is a new pod, the reference delay time calculation unit 120 determines the number of requests transmitted by the new pod per second for each destination, so that a part of the number of requests of an existing pod that executes the same service as that of the new pod is allocated to the new pod. For example, when the number of existing pods that execute a certain service is m, and a new pod is added, then the number of pods that execute the same service is m+1, in some cases. In this case, the reference delay time calculation unit 120 may divide a sum obtained by adding up the number of requests/s per destination of each existing pod into (m+1) equal parts to determine the number of requests/s per destination of each of the existing pods and the new pod. Accordingly, the reference delay time calculation unit 120 may determine the number of requests/s per destination after the addition of the new pod for each of the new pod and the existing pods.

It is conceivable that when the corresponding pod is a new pod and there is no existing pod that executes the same service as that of the new pod, the reference delay time calculation unit 120 sets the number of requests/s per destination of the corresponding pod to 0.

(S13) Based on the total number of requests/s calculated in step S12, and the sidecar information table 111, the reference delay time calculation unit 120 calculates reference delay time in a case of via a sidecar in the corresponding pod. The sidecar for which the reference delay time is calculated is a sidecar of a type originally used by the corresponding pod (a default type of sidecar). The reference delay time calculation unit 120 registers the calculated reference delay time with the reference delay timetable 113. In step S13, the reference delay time calculation unit 120 acquires a type of sidecar of each of the corresponding pod and a destination pod from the master node 200, and registers the type with the service mesh type table 114. The reference delay time calculation unit 120 may specify a default type of sidecar of the corresponding pod from the service mesh type table 114.

(S14) Based on the service mesh type table 114, the delay time calculation unit 130 acquires a service mesh type of the destination pod, for example, a type of the sidecar of the destination pod. For the corresponding pod, the delay time calculation unit 130, based on the request count table 112, calculates the number of requests for each type of the sidecar of the destination pod, and registers the number of requests with the request-count-per-service-mesh-type table 115.

(S15) The delay time calculation unit 130 selects one destination pod for the corresponding pod from the request-count-per-service-mesh-type table 115, and determines whether the type of the sidecar of the destination pod is the same as that of the corresponding pod, or not. When the types are the same, the delay time calculation unit 130 advances the processing to step S16. When the types are not the same, the delay time calculation unit 130 advances the processing to step S19 in FIG. 22. The service mesh type of the destination pod corresponds to a destination type in the request-count-per-service-mesh-type table 115.

(S16) The setting change processing unit 140, in a transfer destination table in iptables of the corresponding pod, sets a transfer destination of a default route by a container that executes a service to its own sidecar for a service mesh. The "its own sidecar for a service mesh" corresponds to a default type of sidecar in the corresponding pod.

(S17) The setting change processing unit 140 determines whether a configuration design, for example, the processes in step S15 and the subsequent steps, is completed, or not, for all service mesh types of the destination of the corresponding pod. When there is an unprocessed service mesh type, the setting change processing unit 140 advances the processing to step S15. When the configuration design is completed for all the service mesh types of the destination of the corresponding pod, the setting change processing unit 140 advances the processing to step S18.

(S18) The setting change processing unit 140 determines whether the configuration design processing is completed for all the pods that are processing target candidates, or not. When the configuration design processing is completed for all the pods, the setting change processing unit 140 ends the configuration design processing. When there is an unprocessed pod, the setting change processing unit 140 advances the processing to step S11.

Figure 22:
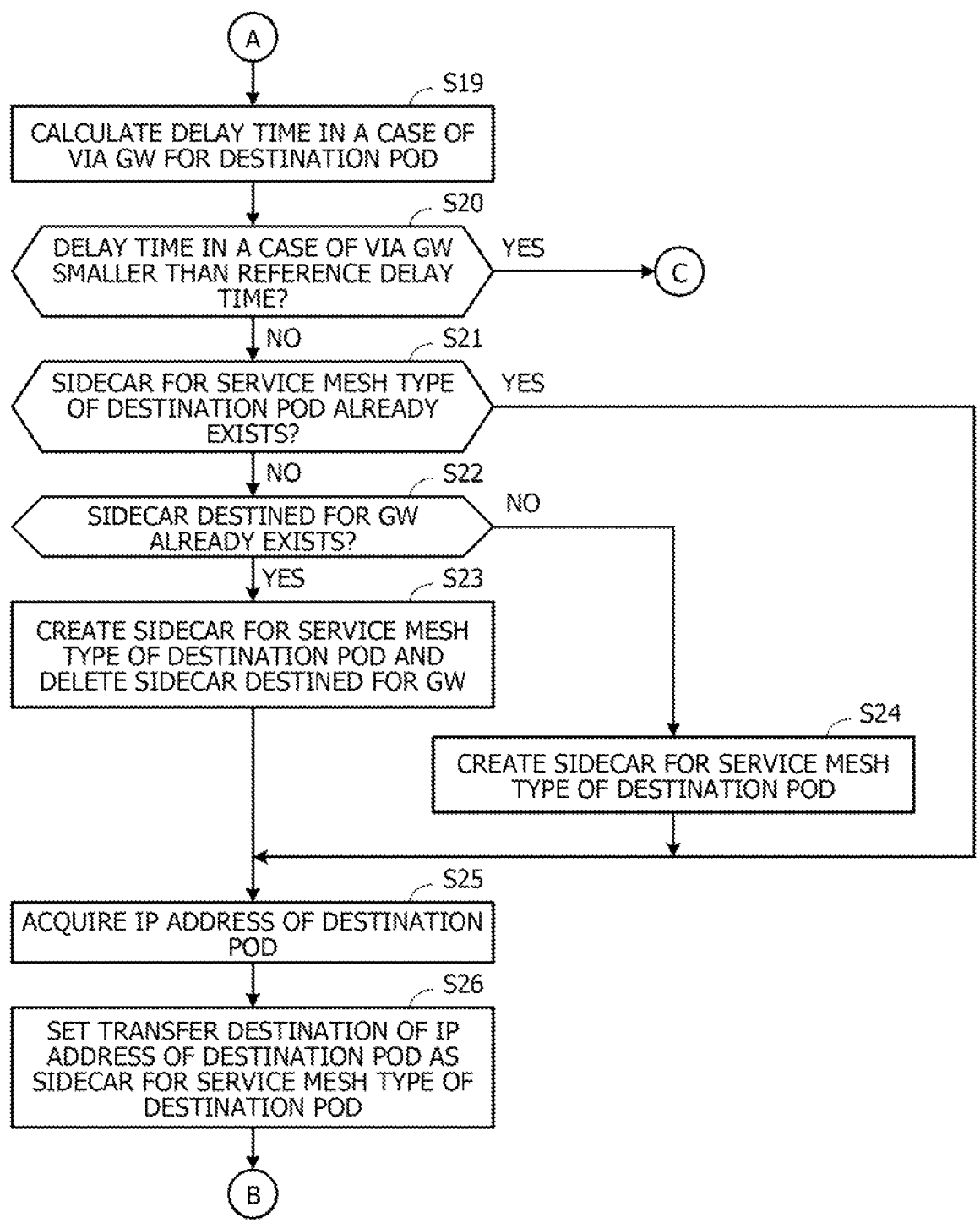
FIG. 22 is a flowchart illustrating the processing example of the managing server (continued)

FIG. 22 is a flowchart illustrating the processing example of the managing server (continued).

(S19) Based on the sidecar information table 111 and the request-count-per-service-mesh-type table 115, the delay time calculation unit 130 calculates delay time in a case of via a GW from the corresponding pod to a destination pod. The delay time calculation unit 130 registers the calculated delay time with the delay-time-via-GW table 116.

(S20) Based on the reference delay timetable 113 and the delay-time-via-GW table 116, the setting change processing unit 140 determines whether the delay time in the case of via the GW from the corresponding pod to the destination pod is shorter than reference delay time of the corresponding pod, or not. When the delay time in the case of via the GW is shorter than the reference delay time of the corresponding pod, the setting change processing unit 140 advances the processing to step S27 in FIG. 23. When the delay time in the case of via the GW is equal to or longer than the reference delay time of the corresponding pod, the setting change processing unit 140 advances the processing to step S21.

(S21) The setting change processing unit 140 determines whether a sidecar for a service mesh type of the destination pod already exists in the corresponding pod, or not. When a sidecar for the service mesh type of the destination pod already exists in the corresponding pod, the setting change processing unit 140 advances the processing to step S25. When a sidecar for the service mesh type of the destination pod does not exist in the corresponding pod, the setting change processing unit 140 advances the processing to step S22.

The setting change processing unit 140 may acquire information indicating a sidecar existing in the corresponding pod and a type of the sidecar by inquiring of the master node 200. When a record of the corresponding pod is already registered with the communication method management table 118, the setting change processing unit 140 may acquire a sidecar existing in the corresponding pod and a type of the sidecar based on the record.

(S22) The setting change processing unit 140 determines whether a sidecar destined for a GW already exists in the corresponding pod, or not. When a sidecar destined for the GW already exists in the corresponding pod, the setting change processing unit 140 advances the processing to step S23. When a sidecar destined for the GW does not exist in the corresponding pod, the setting change processing unit 140 advances the processing to step S24.

(S23) The setting change processing unit 140 creates, for the corresponding pod, a sidecar for the service mesh type of the destination pod, and deletes the sidecar destined for the GW. For example, the setting change processing unit 140 instructs the master node 200 to undeploy the corresponding pod, and instructs the master node 200 to create a sidecar for the service mesh type of the destination pod and deploy the corresponding pod after deleting the sidecar destined for the GW. Accordingly, the corresponding pod is disposed again in any of worker nodes, and the corresponding pod is started. The setting change processing unit 140 advances the processing to step S25.

(S24) The setting change processing unit 140 creates a sidecar for the service mesh type of the destination pod, for the corresponding pod. For example, the setting change processing unit 140 instructs the master node 200 to undeploy the corresponding pod, and instructs the master node 200 to deploy the corresponding pod after the creation of the sidecar for the service mesh type of the destination pod. Accordingly, the corresponding pod is disposed again in any of worker nodes, and the corresponding pod is started. The setting change processing unit 140 advances the processing to step S25.

(S25) The setting change processing unit 140 acquires an IP address of the destination pod corresponding to the corresponding pod from the master node 200, and registers the IP address with the IP address table 117.

(S26) Based on the IP address table 117, the setting change processing unit 140 sets a transfer destination of the IP address of the destination pod to the service mesh type sidecar of the destination pod. For example, the setting change processing unit 140 sets, in iptables of a corresponding pod, setting for transferring a request, which is destined for the IP address of the destination pod from a container that executes a service of the corresponding pod, from the container to the sidecar for the service mesh type of the destination pod. The setting change processing unit 140 registers a record of a communication method of the corresponding pod with the communication method management table 118. The setting change processing unit 140 advances the processing to step S17 in FIG. 21.

Figure 23:
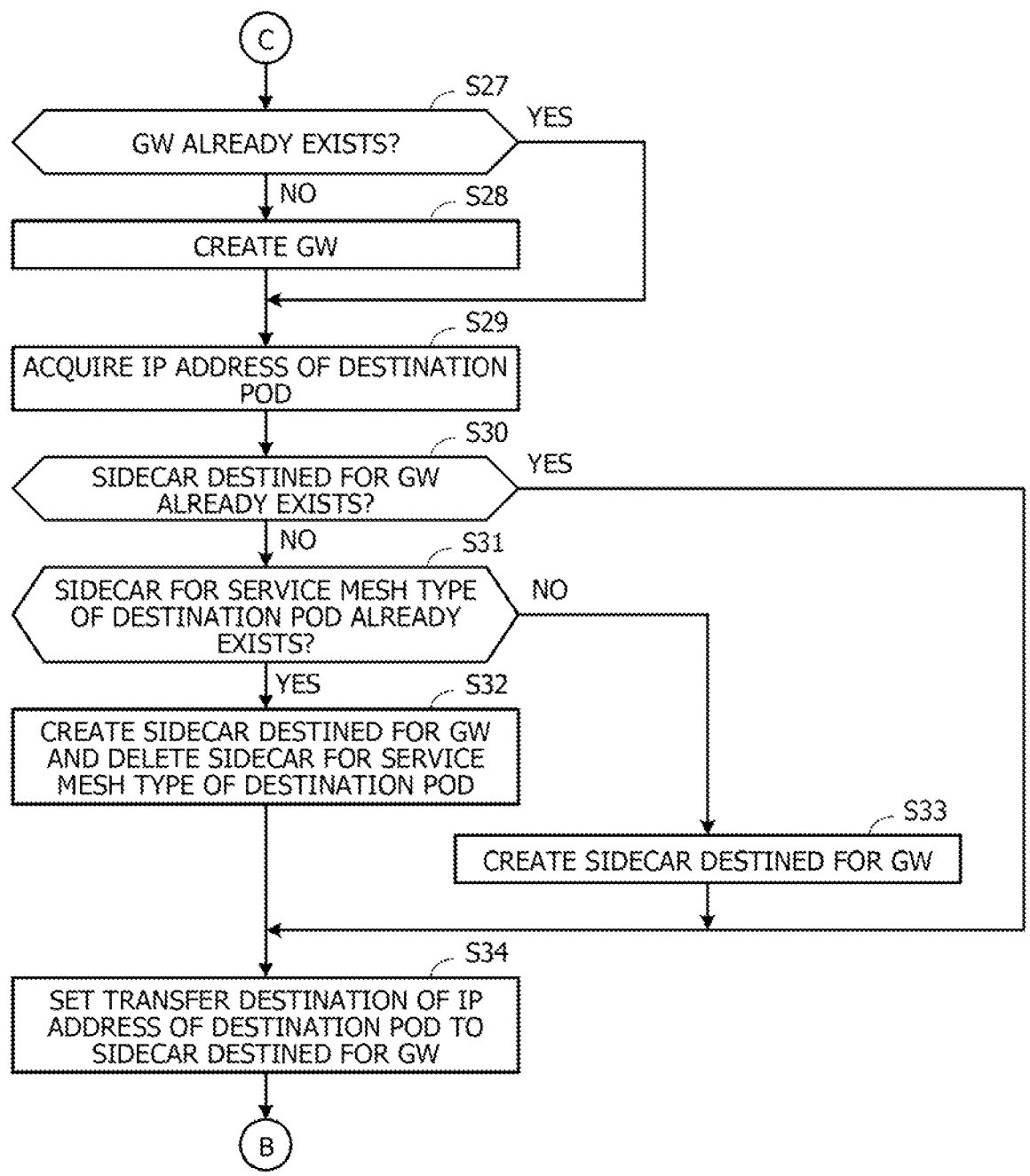
FIG. 23 is a flowchart illustrating the processing example of the managing server (continued)

FIG. 23 is a flowchart illustrating the processing example of the managing server (continued).

(S27) The setting change processing unit 140 determines whether a gateway (GW) that relays a request from the corresponding pod to the service mesh type of the destination pod already exists, or not. When the gateway already exists, the setting change processing unit 140 advances the processing to step S29. When the gateway does not exist, the setting change processing unit 140 advances the processing to step S28.

(S28) The setting change processing unit 140 creates a gateway. For example, the setting change processing unit 140 instructs the master node 200 to dispose a pod that functions as a gateway that relays a request from a service mesh type of the corresponding pod to the service mesh type of the destination pod. Accordingly, a pod of the gateway is disposed in any of worker nodes and is started.

(S29) The setting change processing unit 140 acquires an IP address of the destination pod from the master node 200, and registers the IP address with the IP address table 117.

(S30) The setting change processing unit 140 determines whether a sidecar destined for the GW already exists in the corresponding pod, or not. When a sidecar destined for the GW already exists in the corresponding pod, the setting change processing unit 140 advances the processing to step S34. When a sidecar destined for the GW does not exist in the corresponding pod, the setting change processing unit 140 advances the processing to step S31.

(S31) The setting change processing unit 140 determines whether a sidecar for the service mesh type of the destination pod already exists in the corresponding pod, or not. When a sidecar for the service mesh type of the destination pod already exists in the corresponding pod, the setting change processing unit 140 advances the processing to step S32. When a sidecar for the service mesh type of the destination pod does not exist in the corresponding pod, the setting change processing unit 140 advances the processing to step S33.

(S32) The setting change processing unit 140 creates a sidecar destined for the GW, and deletes the sidecar of the service mesh type of the destination pod, for the corresponding pod. For example, the setting change processing unit 140 instructs the master node 200 to undeploy the corresponding pod, and instructs the master node 200 to create a sidecar destined for the GW and deploy the corresponding pod after deleting the sidecar for the service mesh type of the destination pod. Accordingly, the corresponding pod is disposed again in any of worker nodes, and the corresponding pod is started. The setting change processing unit 140 advances the processing to step S34.

(S33) The setting change processing unit 140 creates a sidecar destined for the GW for the corresponding pod. For example, the setting change processing unit 140 instructs the master node 200 to undeploy the corresponding pod, and instructs the master node 200 to deploy the corresponding pod after creating the sidecar destined for the GW. Accordingly, the corresponding pod is disposed again in any of worker nodes, and the corresponding pod is started. The setting change processing unit 140 advances the processing to step S34.

(S34) Based on the IP address table 117, the setting change processing unit 140 sets a transfer destination of the IP address of the destination pod to the sidecar destined for the GW. For example, the setting change processing unit 140 sets, in iptables of the corresponding pod, setting for transferring a request, which is destined for the IP address of the destination pod from a container that executes a service of the corresponding pod, to the sidecar destined for the GW. The setting change processing unit 140 registers a record of a communication method of the corresponding pod with the communication method management table 118. The setting change processing unit 140 advances the processing to step S17 in FIG. 21.

As a result of performing the above-described procedure, for example, the gateway 900 is no longer used to relay any request in some cases. In this case, the setting change processing unit 140 may instruct the master node 200 to undeploy the gateway 900, to cause the gateway 900 to be undeployed. When the corresponding pod is disposed again in each of steps S23, S24, S32, and S33, the setting change processing unit 140 performs control such that setting information in iptables of the corresponding pods is held before and after the redisposition.

The setting change processing unit 140 repeatedly performs the processes in step S15 to step S17 including the procedure in FIGS. 22 and 23 for one pod in some cases. In this case, the setting change processing unit 140, without disposing a pod again during the repetition, after the repetition is entirely completed, for example, immediately after step S17 results in YES, may dispose the pod once again, to reflect, in the corresponding pod, all the configuration changes related to the sidecar. After that, the setting change processing unit 140 may set a sidecar of a transfer destination for each IP address of the destination pod, in iptables of the corresponding pod.

As described above, the managing server 100 selectively uses, for a request from a certain pod to another pod having a different type of sidecar, the method of transmitting via a GW, or a method of providing a sidecar of the same type as that of a destination in an originating pod, for direct transmission using the sidecar. By comparing reference delay time with delay time in a case where transmission is performed from the corresponding pod via a GW, the managing server 100 may select whether a request destined for a different type of proxy container is transmitted via the GW or directly, to achieve both suppression of the delay time and suppression of a consumed resource amount.

For each pod, a maximum allocation resource amount allowed for the corresponding pod is determined in advance in some cases. In this case, the setting change processing unit 140 may determine whether to perform transmission via a GW, based on the maximum allocation resource amount of each pod, or not.

Figure 24:
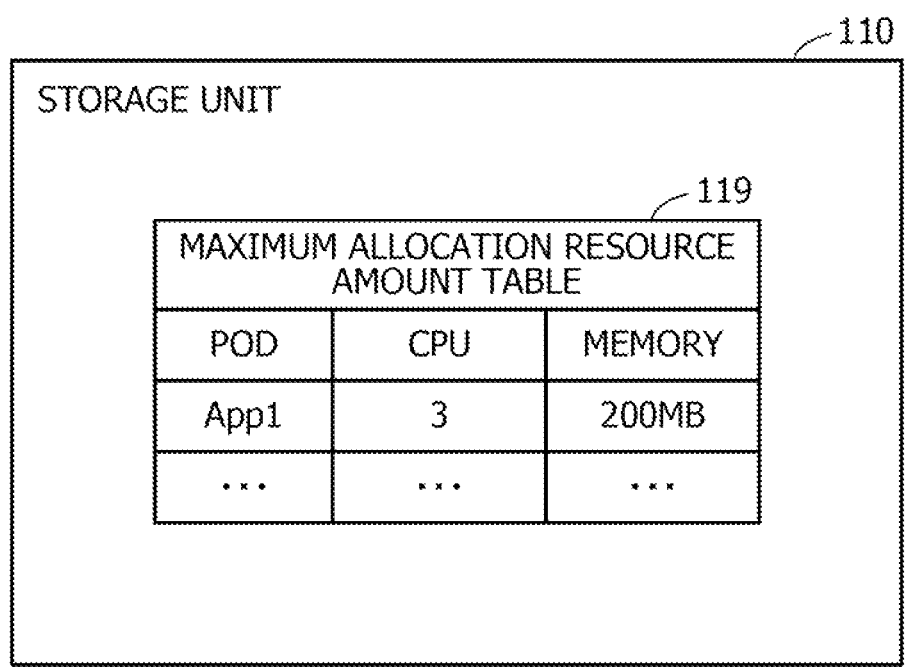
FIG. 24 is a diagram illustrating an example of a maximum allocation resource amount table.

FIG. 24 is a diagram illustrating an example of a maximum allocation resource amount table.

A maximum allocation resource amount table 119 is stored in the storage unit 110 in advance. The maximum allocation resource amount table 119 includes items of a pod, a CPU, and a memory. An identification name of a service in the corresponding pod is registered with the item of pod. A maximum allocation amount of a CPU for the corresponding pod is registered with the item of CPU. A maximum allocation amount of a memory for the corresponding pod is registered with the item of memory.

For example, the maximum allocation resource amount table 119 includes a record of the pod "App 1", the CPU "3", and the memory "200 MB". The record indicates that a maximum allocation resource amount for the pod 600 corresponds to three CPUs and a memory of 200 MB. A maximum allocation resource amount for another pod may also be registered with the maximum allocation resource amount table 119.

Figure 25:
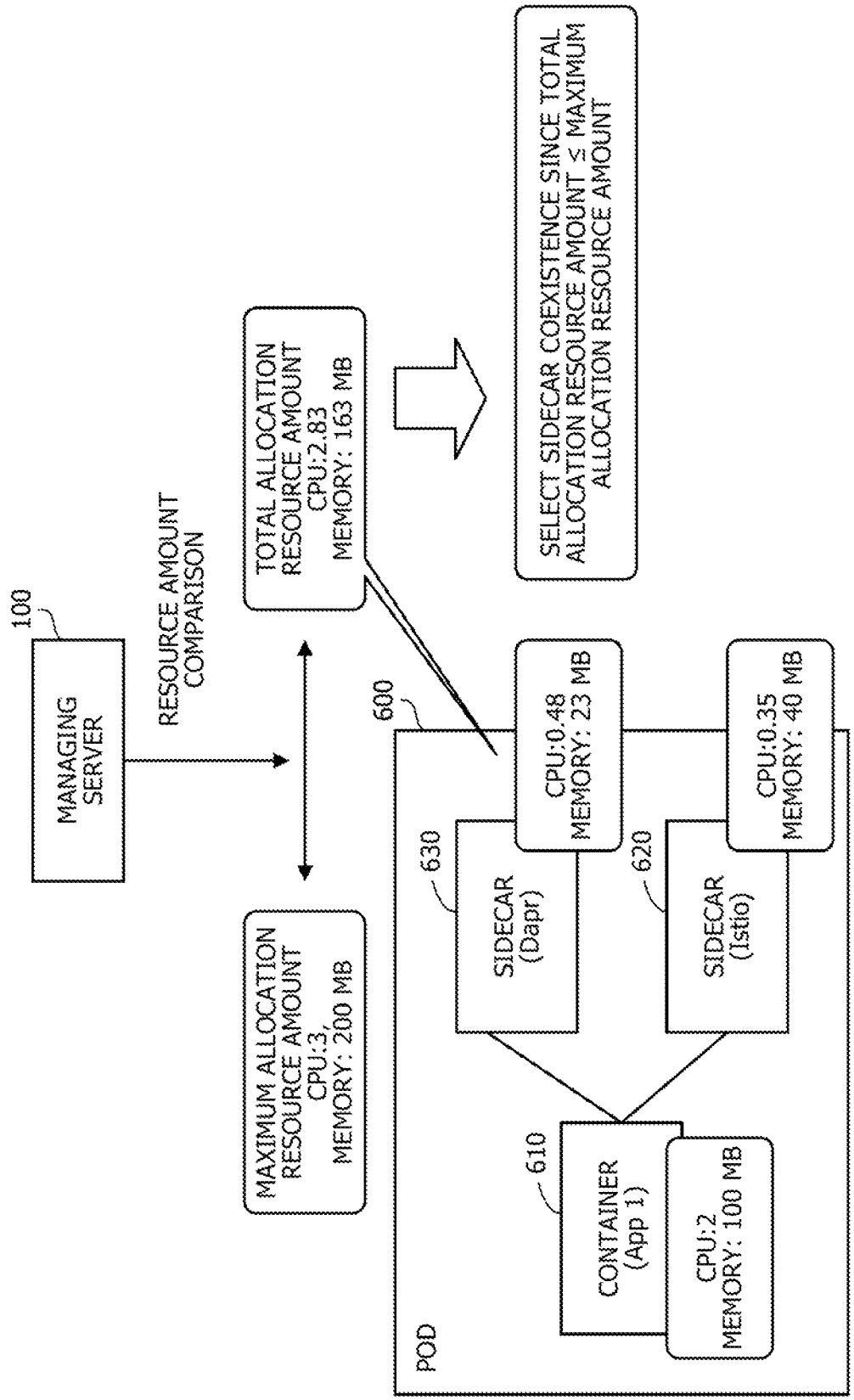
FIG. 25 is a diagram illustrating an example of selecting a communication method in accordance with a maximum allocation resource amount.

FIG. 25 is a diagram illustrating an example of selecting a communication method in accordance with a maximum allocation resource amount.

Even when delay time in a case of via a GW is less than reference delay time, as long as a total allocation resource amount of the pod 600 when different types of sidecars are caused to coexist in the pod 600 is equal to or less than a maximum allocation resource amount, the setting change processing unit 140 causes the different types of sidecars to coexist in the pod 600.

For example, a consumed resource amount of the container 610 in the pod 600 corresponds to two CPUs and a memory of 100 MB. A consumed resource amount of the sidecar 620 corresponds to 0.35 CPUs and a memory of 40 MB. A consumed resource amount of the sidecar 630 corresponds to 0.48 CPUs and a memory of 23 MB. Accordingly, a total allocation resource amount of the pods 600 is the sum of the above, and corresponds to 2.83 CPUs and a memory of 163 MB.

The setting change processing unit 140 compares a maximum allocation resource amount of the pod 600 in the maximum allocation resource amount table 119 with a total allocation resource amount, for each CPU and each memory. For both CPU and memory, when a total allocation resource amount is equal to or less than a maximum allocation resource amount, the setting change processing unit 140 selects direct transmission by sidecar coexistence, rather than transmission via a GW. When the total allocation resource amount is greater than the maximum allocation resource amount for at least one of the CPU and the memory, the setting change processing unit 140 selects transmission via the GW or direct transmission by sidecar coexistence in accordance with a comparison between delay time in the case of via the GW and reference delay time.

When the process in FIG. 25 is performed, the setting change processing unit 140 compares a total allocation resource amount and a maximum allocation resource amount for the corresponding pod immediately before step S19. When the total allocation resource amount is equal to or less than the maximum allocation resource amount, the setting change processing unit 140 advances the processing to step S21. When the total allocation resource amount is greater than the maximum allocation resource amount, the setting change processing unit 140 advances the processing to step S20. The setting change processing unit 140 causes sidecars to coexist in the corresponding pod when the delay time in the case of via the GW is equal to or longer than the reference delay time, but in this case, the total allocation resource amount of the corresponding pod is tolerated to exceed the maximum allocation resource amount.

As described above, when there is a margin in an allocation resource mount allowed for the corresponding pod, the managing server 100 may reduce delay time of communication between pods by selecting request transmission by sidecar coexistence rather than via a GW.

As described above, the managing server 100 executes, for example, the following processing.

The information processing system 2 executes a plurality of container groups including a first container group having a first type of proxy container and a second container group having a second type of first proxy container. A plurality of containers including a container for a service, and a proxy container used for communication with another container group belong to one container group. The reference delay time calculation unit 120 acquires first delay time that is reference delay time when a request is transmitted from the first container group to a destination container group by the first type of proxy container. The delay time calculation unit 130 calculates second delay time based on the number of requests from the first container group to the second container group. The second delay time is delay time when a request from the first container group reaches the second container group via a third container group that relays communication between proxy containers of types different from each other. The setting change processing unit 140, when the second delay time is shorter than the first delay time, performs setting for transmitting a request, which is destined for the second container group from the first container group, to the third container group via the first type of proxy container. The setting change processing unit 140, when the second delay time is equal to or longer than the first delay time, adds a second type of second proxy container to the first container group. The setting change processing unit 140 performs setting for transmitting a request, which is destined for the second container group from the first container group, to the second container group via the second proxy container.

Accordingly, the managing server 100 may use an appropriate communication method in an environment in which a plurality of types of proxy containers are mixed. By calculating delay time based on the number of requests, the reference delay time calculation unit 120 or the delay time calculation unit 130 may appropriately obtain the delay time even when it is difficult to measure delay time in accordance with processing in each proxy container.

When the second delay time is shorter than the first delay time, and even when communication is performed via a GW, communication quality expected for the information processing system 2 is to be satisfied. Accordingly, in this case, the setting change processing unit 140 may transmit a request from the first container group to the second container group via a gateway, for example, via the third container group, to suppress a consumed resource amount.

On the other hand, when the second delay time is equal to or longer than the first delay time, the communication quality expected for the information processing system 2 is not satisfied with the communication via the GW. Accordingly, in this case, the setting change processing unit 140 may transmit the request from the first container group to the second container group directly not via the gateway, for example, not via the third container group, to suppress delay time.

In this manner, by comparing the first delay time with the second delay time, the managing server 100 selects whether to transmit a request destined for a different type of proxy container via a gateway or directly, thereby making it possible to achieve both suppression of delay time and suppression of a consumed resource amount.

The pods 600 is an example of the first container group. The pod 700 is an example of the second container group. The gateway 900 is an example of the third container group. Each of the sidecars 620 and 620a is an example of the first type of proxy container. The sidecar 720 is an example of the second type of first proxy container. The sidecar 630 is an example of the second type of second proxy container.

For example, when the second delay time is shorter than the first delay time, and the second proxy container exists in the first container group, the setting change processing unit 140 deletes the second proxy container from the first container group.

Accordingly, the managing server 100 may delete the redundant proxy container from the first container group, and may reduce a consumed resource amount by the first container group.

When the second delay time is shorter than the first delay time, the setting change processing unit 140 adds a first type of proxy container that transmits a request to the third container group, to the first container group. When the second delay time is equal to or longer than the first delay time, and the added first type of proxy container exists in the first container group, the setting change processing unit 140 deletes the added first type of proxy container from the first container group.

Accordingly, the managing server 100 may reduce delay time of request transmission from the first container group via the third container group. The managing server 100 may delete a redundant proxy container from the first container group, and may reduce a consumed resource amount by the first container group. The sidecar 620a is an example of the proxy container added as the first type of proxy container that transmits a request to the third container group.

The reference delay time calculation unit 120, in acquisition of the first delay time, calculates the first delay time based on the number of all requests transmitted from the first container group per unit time. For example, when all the requests are transmitted by using the first type of proxy container not via the third container group, the reference delay time calculation unit 120 may calculate delay time occurring in the first type of proxy container as the first delay time.

Accordingly, the managing server 100 may control the communication between the container groups such that the delay time is shorter than delay time occurring when the request is directly transmitted by using the first type of proxy container alone. For example, the managing server 100 may determine delay time occurring in the first type of proxy container from delay time corresponding to the predetermined number of requests per unit time, which is made public by a provider of the proxy container.

The third container group includes the first type of proxy container and a second type of proxy container. The third container group receives a request from the first container group by using the first type of proxy container belonging to the third container group. The third container group uses the second type of proxy container belonging to the third container group to transfer the request to the second container group.

Accordingly, the managing server 100 may easily create the third container group that functions as a gateway by using various proxy containers, and add the third container group to the information processing system 2.

The delay time calculation unit 130, in calculation of the second delay time, calculates the second delay time based on the number of requests transmitted from the first container group to the second container group per unit time. For example, the delay time calculation unit 130 calculates delay time occurring in each of the first type of proxy container belonging to the first container group, the first type of proxy container belonging to the third container group, and the second type of proxy container belonging to the third container group. The delay time calculation unit 130 sets a sum of each calculated delay time as the second delay time.

Accordingly, the managing server 100 may appropriately calculate the delay time in the case of via the third container group that functions as the gateway. For example, the managing server 100 may determine the delay time occurring in each proxy container from delay time according to the predetermined number of requests per unit time, which is made public by a provider of the proxy container.

Based on information indicating a maximum allocation resource amount for the first container group, the setting change processing unit 140 compares a total allocation resource amount of the first container group when the second type of second proxy container is added to the first container group, with the maximum allocation resource amount. When the total allocation resource amount is equal to or less than the maximum allocation resource amount, and even when the second delay time is shorter than the first delay time, the setting change processing unit 140 adds the second proxy container to the first container group. The setting change processing unit 140 performs setting for transmitting a request, which is destined for the second container group from the first container group, to the second container group via the second proxy container.

Accordingly, when there is a margin in a resource amount that may be allocated to the first container group, the managing server 100 may further reduce delay time. The maximum allocation resource amount table 119 is an example of information indicating the maximum allocation resource amount for the first container group.

When the second delay time is shorter than the first delay time and the third container group does not exist in the information processing system 2, the setting change processing unit 140 adds the third container group to the information processing system 2.

Accordingly, the managing server 100 may appropriately provide a communication route using the third container group that functions as the gateway in the information processing system 2.

The information processing in the first embodiment may be realized by causing the processing unit 12 to execute a program. The information processing in the second embodiment may be realized by causing the CPU 101 to execute a program. A program may be recorded in the computer-readable recording medium 63.

For example, by distributing the recording medium 63 in which a program is recorded, the program may be distributed. A program may be stored in another computer in advance, and distribute the program via a network. For example, in a computer, a program recorded in the recording medium 63 or a program received from another computer may be stored (installed), in a storage device such as the RAM 102 or the HDD 103, read from the storage device, and executed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing a program for causing a computer to execute a process comprising:
acquiring, where a plurality of containers including a proxy container used for communication with another container group belong to a container group, for an information processing system that executes a plurality of container groups including a first container group having a proxy container of a first type and a second container group having a first proxy container of a second type, first delay time that is reference delay time when a request is transmitted from the first container group to a destination container group by the proxy container of the first type;
calculating second delay time when the request from the first container group reaches the second container group via a third container group that relays communication between proxy containers of types different from each other, based on a count of requests from the first container group to the second container group;
performing, when the second delay time is shorter than the first delay time, setting for transmitting the request, which is destined for the second container group from the first container group, to the third container group via the proxy container of the first type; and
adding, when the second delay time is equal to or longer than the first delay time, a second proxy container of the second type to the first container group, and performing setting for transmitting the request, which is destined for the second container group from the first container group, to the second container group via the second proxy container.

2. The non-transitory computer-readable recording medium according to claim 1, the process further comprising:
deleting, when the second delay time is shorter than the first delay time, and the second proxy container exists in the first container group, the second proxy container from the first container group.

3. The non-transitory computer-readable recording medium according to claim 1, the process further comprising:

adding, when the second delay time is shorter than the first delay time, a proxy container of the first type that transmits the request to the third container group, to the first container group; and deleting, when the second delay time is equal to or longer than the first delay time and the added proxy container of the first type exists in the first container group, the added proxy container of the first type from the first container group.

4. The non-transitory computer-readable recording medium according to claim 1, wherein in the acquiring the first delay time, calculating, based on the count of all requests transmitted from the first container group per unit time, delay time, as the first delay time, occurring in the proxy container of the first type when the all requests are transmitted by using the proxy container of the first type not via the third container group.

5. The non-transitory computer-readable recording medium according to claim 1, wherein the third container group includes a proxy container of the first type and a proxy container of the second type, receives the request from the first container group by using the proxy container of the first type belonging to the third container group, and transfers the request to the second container group by using the proxy container of the second type belonging to the third container group.

6. The non-transitory computer-readable recording medium according to claim 5, wherein in the calculating the second delay time, calculating, based on the count of the requests transmitted from the first container group to the second container group per unit time, delay time occurring in each of the proxy container of the first type belonging to the first container group, the proxy container of the first type belonging to the third container group, and the proxy container of the second type belonging to the third container group; and setting a sum of each calculated delay time as the second delay time.

7. The non-transitory computer-readable recording medium according to claim 1, the process further comprising:

comparing, based on information indicating a maximum allocation resource amount for the first container group, a total allocation resource amount of the first container group when a proxy container of the second type is added to the first container group with the maximum allocation resource amount, and;

adding, when the total allocation resource amount is equal to or less than the maximum allocation resource amount, and even when the second delay time is shorter than the first delay time, the proxy container of the second type to the first container group, and performing setting for transmitting the request, which is destined for the second container group from the first container group, to the second container group via the proxy container of the second type.

8. The non-transitory computer-readable recording medium according to claim 1, the process further comprising:

adding, when the second delay time is shorter than the first delay time, and the third container group does not exist in the information processing system, the third container group to the information processing system.

9. An information processing method performed by a computer, the method comprising:

acquiring, where a plurality of containers including a proxy container used for communication with another container group belong to a container group, for an information processing system that executes a plurality of container groups including a first container group having a proxy container of a first type and a second container group having a first proxy container of a second type, first delay time that is reference delay time when a request is transmitted from the first container group to a destination container group by the proxy container of the first type;

calculating second delay time when the request from the first container group reaches the second container group via a third container group that relays communication between proxy containers of types different from each other, based on a count of requests from the first container group to the second container group;

performing, when the second delay time is shorter than the first delay time, setting for transmitting the request, which is destined for the second container group from the first container group, to the third container group via the proxy container of the first type; and adding, when the second delay time is equal to or longer than the first delay time, a second proxy container of the second type to the first container group, and performing setting for transmitting the request, which is destined for the second container group from the first container group, to the second container group via the second proxy container.

10. An information processing apparatus comprising:

a memory storing, where a plurality of containers including a proxy container used for communication with another container group belong to a container group, for an information processing system that executes a plurality of container groups including a first container group having a proxy container of a first type and a second container group having a first proxy container of a second type, first delay time that is reference delay time when a request is transmitted from the first container group to a destination container group by the proxy container of the first type; and a processor coupled to the memory and configured to perform a process including:

calculating second delay time when the request from the first container group reaches the second container group via a third container group that relays communication between proxy containers of types different from each other, based on a count of requests from the first container group to the second container group;

performing, when the second delay time is shorter than the first delay time, setting for transmitting the request, which is destined for the second container group from the first container group, to the third container group via the proxy container of the first type; and adding, when the second delay time is equal to or longer than the first delay time, a second proxy container of the second type to the first container group, and performing setting for transmitting the request, which is destined for the second container group from the first container group, to the second container group via the second proxy container.

* * * * *